(12) United States Patent
Bent et al.

(10) Patent No.: US 8,583,545 B1
(45) Date of Patent: Nov. 12, 2013

(54) SYSTEMS AND METHODS FOR MONEY FUND BANKING WITH FLEXIBLE INTEREST ALLOCATION

(75) Inventors: Bruce Bent, Manhasset, NY (US); Bruce Bent, II, Manhasset, NY (US); David Edgar Gareis, Maplewood, NJ (US)

(73) Assignee: Island Intellectual Property LLC, Manhasset, NY (US)

( * ) Notice: Subject to any disclaimer, the term of this patent is extended or adjusted under 35 U.S.C. 154(b) by 0 days.

(21) Appl. No.: 13/237,699

(22) Filed: Sep. 20, 2011

Related U.S. Application Data

(60) Provisional application No. 61/384,576, filed on Sep. 20, 2010.

(51) Int. Cl.
*G06Q 40/00* (2012.01)

(52) U.S. Cl.
USPC .................................. 705/38; 705/35; 705/37

(58) Field of Classification Search
USPC .............................. 705/35, 40, 42, 39, 44, 38
See application file for complete search history.

(56) References Cited

U.S. PATENT DOCUMENTS

| | | | |
|---|---|---|---|
| 4,232,367 A | 11/1980 | Youden et al. | |
| 4,346,442 A | 8/1982 | Musmanno | |
| 4,376,978 A | 3/1983 | Musmanno | |
| 4,597,046 A | 6/1986 | Musmanno et al. | |
| 4,674,044 A | 6/1987 | Kalmus et al. | |
| 4,694,397 A | 9/1987 | Grant et al. | |
| 4,700,297 A | 10/1987 | Hagel et al. | |
| 4,751,640 A | 6/1988 | Lucas et al. | |
| 4,774,663 A | 9/1988 | Musmanno et al. | |
| 4,953,085 A | 8/1990 | Atkins | |
| 4,985,833 A | 1/1991 | Oncken | |
| 5,126,936 A | 6/1992 | Champion et al. | |
| 5,206,803 A | 4/1993 | Vitagliano et al. | |
| 5,220,501 A | 6/1993 | Lawlor et al. | |
| 5,235,507 A | 8/1993 | Sackler et al. | |
| 5,262,942 A | 11/1993 | Earle | |

(Continued)

FOREIGN PATENT DOCUMENTS

| | | |
|---|---|---|
| EP | 0 608 322 | 7/1998 |
| JP | 10-049590 A | 2/1998 |

(Continued)

OTHER PUBLICATIONS

U.S. Appl. No. 12/408,507, filed Mar. 20, 2009, Bruce Bent.

(Continued)

*Primary Examiner* — Ojo O Oyebisi
(74) *Attorney, Agent, or Firm* — Foley & Lardner LLP

(57) ABSTRACT

A method, system and program product, the method comprising: accessing, electronic databases, comprising: (i) aggregated account information for a plurality of government backed-insured and interest-bearing aggregated deposit accounts held in a plurality of program institutions; and (ii) source institution deposit information; obtaining transfer data, by a source institution; obtaining time dimension interest rate data, wherein the time dimension interest rate varies depending on how long the deposit has been held in one or more other of the recipient institutions participating in the program; allocating the deposit funds to one or more other of the recipient institutions; generating data for instructions to deposit/transfer funds and/or to withdraw/transfer funds; calculating a respective interest amount for funds of the respective source institutions, based on time dimension interest rate for the period of time; and generating data for allocating interest.

13 Claims, 8 Drawing Sheets

(56) References Cited

U.S. PATENT DOCUMENTS

| | | |
|---|---|---|
| 5,270,922 A | 12/1993 | Higgins |
| 5,291,398 A | 3/1994 | Hagan |
| 5,297,032 A | 3/1994 | Trojan et al. |
| 5,424,938 A | 6/1995 | Wagner et al. |
| 5,631,828 A | 5/1997 | Hagan |
| 5,644,727 A | 7/1997 | Atkins |
| 5,649,116 A | 7/1997 | McCoy et al. |
| 5,671,363 A | 9/1997 | Cristofich et al. |
| 5,689,650 A | 11/1997 | McClelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,826,243 A | 10/1998 | Musmanno et al. |
| 5,848,400 A | 12/1998 | Chang |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,014,642 A | 1/2000 | El-Kadi et al. |
| 6,016,482 A | 1/2000 | Molinari et al. |
| 6,026,438 A | 2/2000 | Piazza et al. |
| 6,032,133 A | 2/2000 | Hilt et al. |
| 6,041,314 A | 3/2000 | Davis |
| 6,044,371 A | 3/2000 | Person et al. |
| 6,047,324 A | 4/2000 | Ford et al. |
| 6,049,782 A | 4/2000 | Gottesman et al. |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,131,810 A | 10/2000 | Weiss et al. |
| 6,154,770 A | 11/2000 | Kostakos |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 | 11/2001 | Killeen et al. |
| 6,363,360 B1 | 3/2002 | Madden |
| 6,374,231 B1 | 4/2002 | Bent et al. |
| 6,408,336 B1 | 6/2002 | Schneider et al. |
| 6,513,020 B1 | 1/2003 | Weiss et al. |
| 6,970,843 B1 | 11/2005 | Forte |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,203,845 B2 | 4/2007 | Sokolic et al. |
| 7,206,761 B2 | 4/2007 | Colvin |
| 7,216,100 B2 | 5/2007 | Elliott |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,392,222 B1 | 6/2008 | Hamilton et al. |
| 7,401,037 B2 | 7/2008 | Arena et al. |
| 7,440,914 B2 | 10/2008 | Jacobsen |
| 7,505,937 B2 | 3/2009 | Dilip et al. |
| 7,509,286 B1 | 3/2009 | Bent et al. |
| 7,519,551 B2 | 4/2009 | Bent et al. |
| 7,529,709 B2 | 5/2009 | Volchek et al. |
| 7,536,340 B2 | 5/2009 | Dheer et al. |
| 7,536,350 B1 | 5/2009 | Bent et al. |
| 7,596,522 B1 | 9/2009 | Jacobsen |
| 7,603,307 B2 | 10/2009 | Jacobsen |
| 7,640,199 B1 * | 12/2009 | Hyland ............................ 705/35 |
| 7,657,761 B2 | 2/2010 | Sokolic et al. |
| 7,668,771 B1 | 2/2010 | Bent et al. |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,716,131 B2 | 5/2010 | Bent et al. |
| 7,720,755 B1 | 5/2010 | Coyle |
| 7,729,987 B1 | 6/2010 | Wakim et al. |
| 7,752,107 B1 | 7/2010 | Bent et al. |
| 7,752,129 B2 | 7/2010 | Bent et al. |
| 7,756,767 B2 | 7/2010 | Cluse et al. |
| 7,769,688 B1 | 8/2010 | Bent et al. |
| 7,788,235 B1 | 8/2010 | Yeo |
| 7,797,207 B1 | 9/2010 | Dilip et al. |
| 7,809,640 B1 | 10/2010 | Bent et al. |
| 7,814,017 B2 | 10/2010 | Vancini et al. |
| 7,837,100 B2 | 11/2010 | Bonalle et al. |
| 7,849,003 B2 | 12/2010 | Egnatios et al. |
| 7,860,771 B2 | 12/2010 | Colvin |
| 7,873,571 B1 | 1/2011 | Wehmer |
| 7,873,573 B2 | 1/2011 | Realini |
| 7,873,677 B2 | 1/2011 | Messing et al. |
| 7,886,969 B2 | 2/2011 | Antoo et al. |
| 7,895,098 B2 | 2/2011 | Beard |
| 7,895,099 B2 | 2/2011 | Whiting et al. |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,945,511 B2 | 5/2011 | O'Brien et al. |
| 8,015,085 B2 | 9/2011 | Blagg et al. |
| 8,019,667 B1 | 9/2011 | Bent et al. |
| 8,019,668 B1 | 9/2011 | Bent et al. |
| 8,032,456 B1 | 10/2011 | Bent et al. |
| 8,036,986 B2 | 10/2011 | Jacobsen |
| 8,051,004 B2 | 11/2011 | Jacobsen |
| 8,051,005 B2 | 11/2011 | Jacobsen |
| 8,086,508 B2 | 12/2011 | Dheer et al. |
| 8,090,651 B2 | 1/2012 | Winslow et al. |
| 8,103,582 B1 | 1/2012 | Zettner |
| RE43,246 E | 3/2012 | Bent et al. |
| 8,150,766 B1 | 4/2012 | Bent et al. |
| 8,191,156 B2 | 5/2012 | Kubo |
| 8,239,321 B1 | 8/2012 | Bent et al. |
| 8,260,697 B1 | 9/2012 | Bent et al. |
| 8,260,705 B1 | 9/2012 | Bent et al. |
| 8,290,859 B1 | 10/2012 | Bent et al. |
| 8,290,860 B1 | 10/2012 | Bent et al. |
| 8,290,861 B1 | 10/2012 | Bent et al. |
| 8,311,916 B1 | 11/2012 | Bent et al. |
| 8,311,939 B1 | 11/2012 | Bent et al. |
| 8,352,342 B1 | 1/2013 | Bent et al. |
| 8,355,985 B1 | 1/2013 | Bent et al. |
| 8,359,267 B1 | 1/2013 | Bent et al. |
| 8,370,236 B1 | 2/2013 | Bent |
| 8,380,621 B1 | 2/2013 | Bent et al. |
| 8,386,382 B1 | 2/2013 | Bent |
| 8,386,383 B1 | 2/2013 | Bent |
| 8,401,962 B1 | 3/2013 | Bent |
| 8,452,702 B1 | 5/2013 | O'Donnell et al. |

(56) References Cited

U.S. PATENT DOCUMENTS

| | | |
|---|---|---|
| 8,458,089 B1 | 6/2013 | Gareis |
| 2001/0023414 A1 | 9/2001 | Kumar et al. |
| 2001/0032182 A1 | 10/2001 | Kumar et al. |
| 2002/0007330 A1 | 1/2002 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0095592 A1 | 7/2002 | Daniell et al. |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0080185 A1 | 5/2003 | Werther |
| 2003/0135437 A1 | 7/2003 | Jacobsen |
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0200174 A1 | 10/2003 | Star |
| 2003/0208438 A1 | 11/2003 | Rothman |
| 2003/0236728 A1 | 12/2003 | Sunderji et al. |
| 2004/0039674 A1 | 2/2004 | Coloma |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0138974 A1 | 7/2004 | Shimamura et al. |
| 2004/0153398 A1 | 8/2004 | Baumgartner et al. |
| 2004/0162773 A1 | 8/2004 | Del et al. |
| 2004/0177036 A1 | 9/2004 | Nutahara et al. |
| 2004/0249741 A1 | 12/2004 | Understein |
| 2005/0044038 A1 | 2/2005 | Whiting et al. |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |
| 2005/0114246 A1 | 5/2005 | Coloma |
| 2005/0154662 A1 | 7/2005 | Langenwalter |
| 2005/0228733 A1 | 10/2005 | Bent et al. |
| 2006/0004655 A1 | 1/2006 | Alexander et al. |
| 2006/0047593 A1 | 3/2006 | Naratil et al. |
| 2006/0106703 A1 | 5/2006 | Del et al. |
| 2006/0155644 A1 | 7/2006 | Reid et al. |
| 2006/0167773 A1 | 7/2006 | Yang et al. |
| 2006/0212385 A2 | 9/2006 | Bent et al. |
| 2006/0212389 A2 | 9/2006 | Bent et al. |
| 2006/0213980 A1 | 9/2006 | Geller et al. |
| 2006/0273152 A1 | 12/2006 | Fields |
| 2007/0043666 A1 | 2/2007 | Burdette |
| 2007/0083938 A1 | 4/2007 | Aoki et al. |
| 2007/0118449 A1 | 5/2007 | De La Motte |
| 2007/0130065 A1 | 6/2007 | Staab et al. |
| 2007/0143196 A1 | 6/2007 | Colvin |
| 2007/0255655 A1 | 11/2007 | Kemper et al. |
| 2007/0271174 A2 | 11/2007 | Bent et al. |
| 2007/0276752 A1 | 11/2007 | Whiting et al. |
| 2007/0288400 A1 | 12/2007 | Menon |
| 2008/0015985 A1 | 1/2008 | Abhari et al. |
| 2008/0046358 A1 | 2/2008 | Holm-Blagg et al. |
| 2008/0065532 A1 | 3/2008 | De La Motte |
| 2008/0097899 A1 | 4/2008 | Jackson et al. |
| 2008/0120228 A1 | 5/2008 | Bent et al. |
| 2008/0133280 A1 | 6/2008 | Ziegler |
| 2008/0133396 A1 | 6/2008 | De La Motte |
| 2008/0195534 A1 | 8/2008 | Landis et al. |
| 2008/0222053 A1 | 9/2008 | Jacobsen |
| 2008/0288398 A1 | 11/2008 | Maricondi |
| 2009/0006985 A1 | 1/2009 | Fong et al. |
| 2009/0012899 A1 | 1/2009 | Friesen |
| 2009/0024496 A1 | 1/2009 | Balachandran et al. |
| 2009/0138412 A1 | 5/2009 | Jacobsen |
| 2009/0241197 A1 | 9/2009 | Troyansky |
| 2009/0327154 A1 | 12/2009 | Van Vooren et al. |
| 2010/0268668 A1 | 10/2010 | Burdette |
| 2010/0274687 A1 | 10/2010 | Ghosh et al. |
| 2010/0274718 A1 | 10/2010 | Ghosh et al. |
| 2011/0106703 A1* | 5/2011 | Jay et al. .................. 705/44 |
| 2011/0208640 A1 | 8/2011 | Geoghegan et al. |
| 2011/0246359 A1 | 10/2011 | O'Brien et al. |
| 2011/0270720 A1 | 11/2011 | Manohar |
| 2011/0276473 A1 | 11/2011 | Blok |
| 2013/0054429 A1 | 2/2013 | Minor et al. |

FOREIGN PATENT DOCUMENTS

| | | |
|---|---|---|
| WO | WO-95/23379 A1 | 8/1995 |
| WO | WO-99/18529 A1 | 4/1999 |
| WO | WO-02/42952 A1 | 5/2002 |
| WO | WO-03/012580 A2 | 2/2003 |
| WO | WO-2005/006111 A2 | 1/2005 |

OTHER PUBLICATIONS

U.S. Appl. No. 13/829,747, filed Mar. 14, 2013, O'Donnell.
12 CFR Part 330; Simplification of Deposit Insurance Rules; Federal Register, vol. 63 Issue 90; May 11, 1998; pp. 1-31.
U.S. Appl. No. 12/453,387, filed May 8, 2009, Bruce Bent.
U.S. Appl. No. 12/453,388, filed May 8, 2009, Bruce Bent.
U.S. Appl. No. 12/622,979, filed Nov. 20, 2009, Bruce Bent.
U.S. Appl. No. 12/638,544, filed Dec. 15, 2009, Bruce Bent.
U.S. Appl. No. 12/794,448, filed Jun. 4, 2010, Bruce Bent.
U.S. Appl. No. 12/816,092, filed Jun. 15, 2010, Bruce Bent.
U.S. Appl. No. 13/032,456, filed Feb. 22, 2011, David Edgar Gareis.
U.S. Appl. No. 13/032,467, filed Feb. 22, 2011, Thomas O'Donnell.
U.S. Appl. No. 13/228,031, filed Sep. 8, 2011, Thomas O'Donnell.
U.S. Appl. No. 13/237,699, filed Sep. 20, 2011, Bruce Bent.
U.S. Appl. No. 13/248,647, filed Sep. 29, 2011, Bruce Bent.
U.S. Appl. No. 13/529,540, filed Jun. 21, 2012, Bruce Bent.
U.S. Appl. No. 13/562,961, filed Jul. 31, 2012, Bruce Bent.
U.S. Appl. No. 13/591,793, filed Aug. 22, 2012, Bruce Bent.
U.S. Appl. No. 13/591,818, filed Aug. 22, 2012, Bruce Bent.
U.S. Appl. No. 13/650,927, filed Oct. 12, 2012, David Edgar Gareis.
U.S. Appl. No. 13/651,932, filed Oct. 15, 2012, Bruce Bent.
U.S. Appl. No. 13/710,999, filed Dec. 11, 2012, Bruce Bent, II.
U.S. Appl. No. 13/715,370, filed Dec. 14, 2012, Bruce Bent.
U.S. Appl. No. 13/733,645, filed Jan. 3, 2013, Bent.
U.S. Appl. No. 13/735,631, filed Jan. 7, 2013, Bent.
U.S. Appl. No. 13/736,515, filed Jan. 8, 2013, Bent.
U.S. Appl. No. 13/759,434, filed Feb. 5, 2013, Bent.
U.S. Appl. No. 13/801,501, filed Mar. 13, 2013, Bent.
U.S. Appl. No. 13/801,874, filed Mar. 13, 2013, Bent.
U.S. Appl. No. 13/828,468, filed Mar. 14, 2013, Gareis.
U.S. Appl. No. 13/828,929, filed Mar. 14, 2013, Gareis.
U.S. Appl. No. 13/829,309, filed Mar. 14, 2013, O'Donnell.
U.S. Appl. No. 13/829,974, filed Mar. 14, 2013, Bent.
U.S. Appl. No. 13/830,143, filed Mar. 14, 2013, Bent.
U.S. Appl. No. 13/839,890, filed Mar. 15, 2013, Bent.
U.S. Appl. No. 13/840,685, filed Mar. 15, 2013, Bent.
U.S. Appl. No. 13/841,778, filed Mar. 15, 2013, Bent.
U.S. Appl. No. 13/842,360, filed Mar. 15, 2013, Bent.
U.S. Appl. No. 13/842,630, filed Mar. 15, 2013, Bent.
U.S. Appl. No. 11/641,046, filed Dec. 19, 2006, Bruce Bent et al.
U.S. Appl. No. 11/840,060, filed Aug. 16, 2007, Bruce Bent et al.
U.S. Appl. No. 12/385,522, filed Apr. 10, 2009, Bruce Bent et al.
U.S. Appl. No. 12/408,507, filed Mar. 20, 2009, Bruce Bent et al.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/453,390, filed May 8, 2009, Bruce Bent.

(56) References Cited

OTHER PUBLICATIONS

U.S. Appl. No. 12/622,979, filed Nov. 20, 2009, Bruce Bent et al.
FDIC Federal Register Citations: Email from Bert Ely to Comments, Mar. 8, 2006, Subject: Large-Bank Deposit Insurance Determination Proposal—RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
*Island Intellectual Property LLC et al. v. Deutsche Bank AG, et al.*; Memorandum and Order; Case 1:09-cv-02675-KBF; Doc. 289; Feb. 14, 2012; pp. 1-28.
*Island Intellectual Property LLC et al. v. Deutsche Bank AG, et al.*; Order; Case 1:09-cv-02675-KBF; Doc. 221; Feb. 14, 2012; pp. 1-34.
*Island Intellectual Property LLC et al. v. Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.
*Island Intellectual Property LLC et al. v. Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al. v. Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC et al. v. Deutsche Bank Trust Company Americas, et al.*; Memorandum and Order; Case 1:09-cv-02675-KBF; Doc. 265; Feb. 6, 2012; pp. 1-22.
*Island Intellectual Property LLC et al. v. Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al. v. Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 6, 2012; pp. 1-10.
*Island Intellectual Property LLC et al. v. Deutsche Bank Trust Company Americas, et al.* ; Plaintiffs' motion in limine #4 to preclude evidence and argument regarding Plaintiffs confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al. v. Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.
*Island Intellectual Property LLC et al. v. Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al. v. Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.

Knight-Ridder; Money Matters, Tips you can use—Limits Apply as FDIC Insurance Covers Depositor, Not Account; Chicago Tribune; Feb. 4, 1998; 2 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
Lawsuit by Island Intellectual Property LLC against First Southwest Company; Complaint for Patent Infringement; Civil Action No. 1:11-cv-00371-UNA; Apr. 26, 2011; 42 pages.
*Lawsuit by Island Intellectual Property LLC et al. v. Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).
*Lawsuit by Island Intellectual Property LLC v. Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
*Lawsuit by Island Intellectual Property LLV v. Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
*Lawsuit by Island Intellectual Property LLC v. Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
*Lawsuit by Island Intellectual Property LLC v. First Southwest Company*; First Southwest Company's Answer to Complaint and Counterclaims; Civil Action 1:11-cv-371-SD; Jun. 20, 2011; 11 pages.
*Lawsuit by Island Intellectual Property LLC, et al. v. Deutsche Bank Trust Company Americas et al.*; Declaration of Olivia M. Kim in Support of Defendants' Motion for Summary Judgment of Invalidity Under 35 U.S.C. § 101; Oct. 6, 2011; Case 1:09-cv-02675-VM, Document 197.
*Lawsuit by Island Intellectual Property LLC, et al. v. Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.
*Lawsuit by Island Intellectual Property LLC, et al. v. Deutsche Bank Trust Company Americas, et al.*; Defendants Reply in Support of Their Motion for Summary Judgement of Invalidity Under 35 U.S.C. § 101; Nov. 15, 2011; Case 1:09-cv-02675-VM, Document 208.
*Lawsuit by Island Intellectual Property LLC, et al. v. Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
*Lawsuit by Island Intellectual Property LLC, et al. v. Deutsche Bank Trust Company Americas, et al.*; Order; Dec. 7, 2011; Case 1:09-cv-02675-VM, Document 212.
*Lawsuit by Island Intellectual Property LLC, et al. v. Deutsche Bank Trust Company Americas, et al.*; Special Master's Report and Recommended Decision on Defendants' Summary Judgment Motion of Invalidity Under 35 U.S.C. § 101; Dec. 19, 2011.
*Lawsuit by Island Intellectual Property LLC, et al. v. Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.
Martens, Don W.; letter to Hon. Victor Marrero re. supplement to letter of Nov. 28, 2011 on tentative rulings on claim construction in *Island Intellectual Property LLC et al. v. Deutsche Bank Trust Co., et al.*; Nov. 28, 2011; Case 1:09-cv-02675-VM; Document 211.
Martens, Don W.; letter to Hon. Victor Marrero re. tentative rulings on claim construction in *Island Intellectual Property LLC et al. v. Deutsche Bank Trust Co., et al.*; Nov. 28, 2011; Case 1:09-cv-02675-VM, Document 210.
Scottrade Bank Deposit Program—Terms, Conditions & Disclosures; Author unknown; 8-11; pp. 1-3.
*Lawsuit by Island Intellectual Property LLC, et al. v. Deutsch Bank Trust Company Americas, et al.*; Defendant Deutsche Bank Trust

(56) References Cited

OTHER PUBLICATIONS

Company Americas' Second Supplemental Responses to Double Rock's Interrogatories Nos. 2, 8 and 9, Jul. 2010, 65 pages.
Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Investors Investors MoneyAccount$^{SM}$ and Insurance Plus Service Agreement, attached Schedule A (List of Banks Participating in the Insurance Plus Service), IMAD Mar. 1994, 3 pages.
Investors Money Account$^{SM}$ (an FDIC-insured money market account), IMA-1 (Mar. 1994), 4 pages.
Investors MoneyAccount$^{SM}$, "The FDIC-Insured Money Market Investment with an Important Plus," IMA Oct. 1995, 2 pages.
1985 SEC No-Act. LEXIS 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services the Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, Date Mailed Sep. 23, 2009, 4 pages.
USPTO Office Action, Office Action Summary, U.S. Appl. No. 11/767,827, Date Mailed Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, 'Quest Insured Account, (attached Appendix A), 5 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Program$^{SM}$, (attached Q&A: Important Information about the New Salomon Smith Barney Bank Deposit Program), Aug. 16, 2002, 14 pages.
Salomon Smith Barney, "Bank Deposit Program Disclosure Statement," 3 pages.
FDIC, FDIC Law, Regulations, Related Acts—4000—Advisory Opinions, Oct. 22, 1987, J.W. Via, Jr., Counsel [online] [Retrieved on Jan. 22, 2010]. Retrieved from the Internet: URL: http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Aryan, 4 pages.
Merrill Lynch & Co Inc—MER, 10k WIZARD, Form 8-K, "Report of Unscheduled Material Events or Corporate Changes," Filed Mar. 7, 2002, 51 pages.
Federal Reserve System, Lexsee 51 FR 9632, "Definition of Deposit and Technical Amendments," Action: Final Rule, Mar. 20, 1986, 13 pages.
Federal Reserve System, Lexsee 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.

(56) References Cited

OTHER PUBLICATIONS

Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, Lexsee 47 FR 55207, "Reserve Requirements of Depository Institutions; Money Market Deposit Account," Dec. 8, 1982, Action: Final Rule, 5 pages.
Insured Bank Deposits™ Program Summary Information Statement, 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital Builders$^{SM}$ Account Financial Service, Insured Savings$^{SM}$ Account Participating Depository Institutions, 1996, 2 pages.
Insured Deposit Account, May 21, 1996, 14 pages.
An Introduction to the Smith Barney Insured Deposit Account, 8 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
American Express—Meeting Notes, Sep. 26, 2000, 2 pages.
American Express Conference Call Minutes, Topic: Tiered Balances, Jan. 25, 2001 @ 3:00pm-4:00pm, 2 pages.
American Express Financial Advisors Customized FDIC Product with Tiered Balances, Jan. 24, 2001, 2 pages.
Email to abufalino@vedderprice.com, from S. Johnson, Re: ReserveFunds and Wayne Hummer, dated Jul. 14, 2003 (attached email to S. Johnson, from abufalino@vedderprice.com on Jun. 26, 2003, Re: ReserveFunds and Wayne Hummer), 2 pages.
Fax to T. Vezeau, from L. Boone, Re: BBII's request to fax to you, dated Dec. 26, 2002 (attached Memo to K.A. Jacklin, from A. Rova, Re: Lert discovery, dated Dec. 23, 2002), 3 pages.

Letter to A.J. Bufalino, from C.R. Macedo, Re: Reserve Management Corporation, Wayne Hummer Investments LLC, Our File: 71297/80, dated Jan. 3, 2006, 2 pages.
Letter to A.J. Bufalino, from C.R. Macedo, Re: Reserve Management Corporation, Wayne Hummer Investments LLC, Our File: 71297/80, dated Feb. 23, 2006, 1 page.
Letter to A.J. Bufalino, from C.R. Macedo, Re: Reserve Management Corporation, Wayne Hummer Investments LLC, Our File: 71297/80, dated May 8, 2007, 2 pages.
Letter to A.J. Bufalino, from C.R. Macedo, Re: Reserve Management Corporation, Wayne Hummer Investments LLC, Our File: 71297/80, dated May 8, 2007 (attached Appendices 1-3) 6 pages.
Letter to A.J. Bufalino, from S. Johnson, Re: Response to May 29, 2003 letter/email correspondence, dated Aug. 5, 2003, 1 page.
Letter to A.J. Bufalino, from S. Johnson, Re: Response to May 29, 2003 letter/email correspondence, dated Aug. 5, 2003 (enclosing Jul. 16, 2003 letter to T.M. McDonald, May 29, 2003 fax to B. Bent II, Jan. 10, 2003 letter to R.L. Kratzer, note page), 7 pages.
Letter to A.J. Bufalino from S. Johnson, Re: U.S.P.N. 6,374,231, dated May 29, 2003, 2 pages.
Letter to A.J. Bufalino, from T.J. Vezeau, Re: U.S.P.N. 6,374,231, dated Feb. 11, 2003, 1 page.
Letter to C.R. Macedo, from A.J. Bufalino, Re: Reserve Management Corporation, Wayne Hummer Investments LLC, Our File: 71297/80, dated Mar. 16, 2006, 1 page.
Letter to J. Van De Graff, from R.L. Kratzer, Re: Reserve Management Corp. Assertion, dated Feb. 13, 2003, 1 page.
Letter to R.L. Kratzer, from T.J. Vezeau, Re: U.S.P.N. 6,374,231, dated Jan. 10, 2003, 1 page.
Letter to T.J. Vezeau, from A.J. Bufalino, Re: U.S.P.N. 6,374,231, dated Feb. 7, 2003, 1 page.
Letter to T.M. McDonald, from B. Bent II, Re: FDIC insured money market products, dated Jul. 16, 2003, 1 page.
Letter to T.M. McDonald, from B. Bent II, Re: FDIC insured money market products, dated Jul. 16, 2003 (enclosing Jul. 14, 2003 email to abufalino@vedderprice.com, May 29, 2003 letter to A.J. Bufalino, Feb. 13, 2003 letter to J. Van De Graaff, Feb. 11, 2003 letter to A.J. Bufalino, Feb. 7, 2003 letter to T.J. Vezeau, Jan. 10, 2003 letter to R.L. Kratzer), 9 pages.
Memo to Bruce Bent, from Bruce Bent II, Re: S&M Status, Oct. 15, 1997 (cc: Arthur, Mary, Marianne, Joe, Pat, Cathy, Michelle), 1 page.
Memo to Marianne, Pat, Bruce Bent, from Bruce Bent II, Re: Reserve Insured Deposit Account, Sep. 4, 1997, 1 page.
Memo to Marianne, Ralph, Customer Service, from Bruce Bent II, Re: Reserve IDA, Sep. 4, 1997, 1 page.
Case for "Core" Deposits, Historic Degree of Stability, 2006, 1 page.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
U.S. Appl. No. 12/025,402, filed Feb. 4, 2008, Bent.
U.S. Appl. No. 12/794,448, filed Jun. 4, 2010, Bruce Bent et al.
U.S. Appl. No. 12/794,545, filed Jun. 4, 2010, Bruce Bent et al.
U.S. Appl. No. 12/816,092, filed Jun. 15, 2010, Bruce Bent, II et al.
U.S. Appl. No. 12/829,961, filed Jul. 2, 2010, Bruce Bent, et al.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.

(56) References Cited

OTHER PUBLICATIONS

AB 2011 Assembly Bill—Bill Analysis, Senate Rules Committee, Third Reading, http://www.leginfo.ca.gov/pub/bill/asm/ab_2001-2050/ab_2011_cfa 20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Announcing Changes in Automatic "Sweep" Investment Options, LPL Financial Services, Linsco/Private Ledger, Member NASD/SIPC, 26 Sheets.
Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.
Blackwell, "New Pitch: Deposit Insurance Sharing," American Banker Online, 4 Sheets, Jan. 21, 2003.
Board of Governors of the Federal Reserve System, 1984 Fed. Res. Interp. Ltr. LEXIS 56, Nov. 16, 1984, 3 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
Board of Governors of the Federal Reserve System, 1994 Fed. Res. Interp. Ltr. LEXIS 156, Jun. 24, 1994, 3 Sheets.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, Cib 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing on Wall Street, 2 Sheets, Feb. 1, 2003.

CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.
CMA, The Investor Credit Line Service, CostEffective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith Incorporated, Jan. 1997, 35 Sheets.
Litigation Notice After Payment of Issue Fee filed in Parent U.S. Appl. No. 10/382,946, Apr. 3, 2009, 160 pages.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D, Mar. 1, 2007, (6 Sheets).
Deposit Growth Strategies for Financial Institutions, New Sweep Account Helps Retain $40 Million in Business Deposits, vol. 7, No. 12, The Reserve Funds, May 2001, 1 Sheet.
Deutsche Bank Insured Deposit Program, Marketing Literature 2007, 3 pages.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Dreyfus Insured Deposit Program, Disclosure Statement and Terms and Conditions, Dreyfus A BNY Mellon Company, Jan. 2008, 8 Sheets.
Dreyfus Insured Deposit Program, Multiple List Program—Effective May 11, 2009, 1 Sheet.
Email from Olivia Kim to Charles Macedo on Jun. 9, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential-Attorneys only, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).

(56) References Cited

OTHER PUBLICATIONS

FDIC, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancial/1997/fil97111b.html.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Finistar, Providing FDIC Insured Funds as a Stable Source of Deposits to Commercial Banking Institutions, 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frost1/scripts/products/product_detail.jsp?BV_.
Garmhausen, "Matching Small Banks with Large Muni Deposits," American Banker, Online the Financial Services Resource, Oct. 4, 2005, 4 pages, http://www.finstar.com/docs/AmericanBanker.html.
Heavyweight Funding, Bankers News, Mar. 4, 2003, vol. II, Issue No. 5, 2 Sheets.
Hencke, "New Rules for FDIC deposit Insurance", ABA Bank Compliance, vol. 20, No. 7, Jul./Aug. 1999, pp. 31-37.
Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/ , 2009, 1 Sheet.
In the Know, Important Information About Your Account, Smith Barney Citigroup, 2005, 6 Sheets.
Insured Bank Deposit Program Summary Information Statement, Information Statement, and list of Eligible Program Banks Effective Feb. 10, 2005, 11 pages.
Insured Cash Account Program Disclosure Booklet, LPL Financial Services, Linsco/Private Ledger, Member NASD/SIPC, Apr. 2006, 14 pages.
Jong et al., "The Valuation and Hedging of Variable Rate Savings Accounts," University of Amsterdam, Nov. 15, 2001, 23 Sheets.
Keenan, "Tapping Brokerages for Alternative to CDs," American Banker, The Financial Services Daily, 3 Sheets, Feb. 18, 2004.
Lake Forest Bank & Trust Company, Introducing MaxSafe Deposit Accounts with up to $3.75 Million in FDIC Insurance, www.lakeforestbank.com/maxsafe, Nov. 21, 2008, 2 Sheets.
Lavine, "Check Out High-Yield Checking Accounts," Broward Daily Business Review, vol. 39, No. 102, 2 Sheets, Apr. 27, 1998.
Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.
Lawsuit by Carlo DeBlasio et al. against Merrill Lynch & Co., Inc. et al., Declaration of Andrew W. Stern, including Exhibits A, B, C, D, E and F, Nov. 12, 2007, Case No. 07-cv-318 (RJS) (Document 59).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks", Feb. 5, 2008.
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).
Lawsuit by Carlo DeBlasio et al. against Merrill Lynch & Co., Inc. et al., Declaration of Kenneth I. Schacter, including Exhibits A, B, C, D, F, G, H, I, J, K, L, M, N, 0, P, Q and R, Nov. 14 2007, Case No. 07-cv-318 (RJS) (Document 69).
Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14, 2007, Case No. 07-318 (RJS) (Document 67).
Lawsuit by Carlo DeBlasio et al. against Merrill Lynch & Co., Inc. et al., Declaration of Scott D. Musoff in Support of the Merrill Lynch Defendants' Motion to Dismiss the Second Amended Class Action Complaint, ECF Case, Nov. 12, 2007, Case No. 07-cv-318 (RJS) (Document 64).
Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).
Lawsuit by Carlo DeBlasio et al. against Merrill Lynch & Co., Inc. et al., Second Amended Class Action Complaint, Jury Trial Demanded, Introduction and Summary of Allegations, Jun. 11, 2007, Case No. 07-cv-318-VM.
Lawsuit by Carlo DeBlasio et al. against Merrill Lynch & Co., Inc. et al., Supplemental Declaration of Matthew J. Terry in Support of Motion to Dismiss by Defendants Wachovia Corp., Wachova Securities, LLC, Wachovia Bank N. A., and Wachovia Bank of Delaware, N.A., including Exhibits A and B, Mar. 6, 2008, Case No. 07-cv-318 (RJS) (Document 79).
Lawsuit by Carlo DeBlasio, et al. against Merrill Lynch & Co., Inc., et al., Opinion and Order Regarding Motions, Jul. 27, 2009, Case No. 07 Civ 318(RJS).
Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).
Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).
Lawsuit by Island Intellectual Property LLC and Intrasweep LLC against Institutional Deposits Corp. The Island Plaintiffs' Complaint against Defendant Institutional Deposits Corp., Nov. 4, 2009, Civil Action No. 1 09-CV-3079.
Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.
Lawsuit by Island Intellectual Property LLC and Intrasweep LLC against Institutional Deposits Corp., Consent Order, Apr. 21, 2010, Case No. 09-CV-3079 (Document 44).
Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).
Lawsuit by Island Intellectual Property LLC and Lids Capital LLC against Deutsche Bank Trust Company Americas and Total Bank

(56) References Cited

OTHER PUBLICATIONS

Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).
Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Document 114).
Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,771; 7,668,772, 7,672,886; and 7,680,734; and Exhibits A-R; Civil Action No. 09 Civ. 2675(VM)(AJP), Oct. 28, 2010; 1.119 pages.
Lawsuit by Island Intellectual Property LLC, et al. against Deutsche Bank Trust Company Americas, et al,. Defendant Deutsch Bank Trust Company Americas' Responses to Double Rock's Interrogatories Nos. 1-10; May 2010; Civil Action No. 09 Civ. 2675 (VM)(AJP).
Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.
Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ. 2675 (VM)(AJP); Nov. 23, 2010; 107 pages.
Lawsuit by Island Intellectual Property LLC, et al. against Deutsche Bank Trust Company Americas; Defendant Total Bank Solutions, LLC's Responses to Double Rock's Common Interrogatory Nos. 1-10 to Defendants; May 2010; Civil Action No. 09 Civ. 2675 (VM)(AJP).
Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by Island Intellectual Property LLC, et al., against Deutsche Bank Trust Company Americas, et al.; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 Civ 4673.
Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.
Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.
Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).
Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).
Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counter Claims, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counterclaims, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network, LLC's, Counterclaim with Prejudice, Oct. 19, 2009, (Document 68).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and order, Oct. 29, 2009, Case No. 09 CV 2675 (VM) (AJP) (Document 73).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 Civ 2675 (VM).
Lawsuit by Island Intellectual Property LLC, Lids Capital LLC, Double Rock Corporation and Intrasweep LLC against Promontory

(56) References Cited

OTHER PUBLICATIONS

Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).

Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.

Lawsuit by Promontory Interfinancial Network, LLC against Double Rock Corporation p/k/a Reserve Management Corporation, Complaint, Mar. 24, 2009, Civil Action No. 1:09 CV 316.

Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.

Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.

Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.

Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.

Letter From Jamey Basham, Attorney, Lexsee 1990 FDIC Interp. Ltr., Lexis 1, Federal Deposit Insurance Corporation, FDIC-90-02, Jan. 3, 1990, 2 Sheets.

Letter From Joseph A. DiNuzzo, Counsel, Oct. 20, 1999, FDIC, Federal Deposit Insurance Corporation, 1 Sheet.

Letter From Merle Y. Waldman, Lexsee 1985 Sec No- Act., Lexis 1593, Securities Exchange Act of 1934—Section 15(a), Jan. 8, 1985, 11 Sheets.

Letter from Michael Bradfield, General Counsel, Board of Governors of the Federal Reserve System, Nov. 16, 1984, 4 Sheets.

Letter From Oliver I. Ireland, Associate General Counsel, Board of Governors of the Federal Reserve System, Jun. 22, 1988, 5 Sheets.

Letter From Roger A. Hood, Assistant General Counsel, Jul. 16, 1986, FDIC, Federal Deposit Insurance Corporation, Legal Division, 1 Sheet.

Letter from Roger M. Zaitzeff, Seward & Kissel to Gilbert T. Schwartz, Associate General Counsel, Board of Governors of the Federal Reserve System; May 10, 1983, 5 sheets.

Letter from Stephanie Martin, Assoc. General Counsel, Board of Governors of the Federal Reserve System, Apr. 22, 2004, 8 Sheets.

Letter From William W. Wiles, Secretary of the Board, Board of Governors of the Federal Reserve System, Jun. 22, 1983, 6 Sheets.

Letter to Mr. James E. Creekman, Group Vice President, From Oliver Ireland, Associate General Counsel, Aug. 1, 1995, 4 Sheets.

Letter to Mr. Jonathan L. Levin, Esq., From Oliver Ireland, Associate General Counsel, Oct. 18, 1996, 2 Sheets.

Letter to Mr. L.P. Fleming, Jr., Esq., From Oliver Ireland, Associate General Counsel, Feb. 7, 1995, 3 Sheets.

Letter to Ms. Brenda L. Skidmore, Senior Vice President, From Oliver Ireland, Associate General Counsel, Aug. 30, 1995, 4 Sheets.

Letter to William R. Burdette, CEO, Apr. 6, 2009, FDIC, Federal Deposit Insurance Corporation, 2 pages.

Letter to William R. Burdette, CEO, Nov. 15, 2007, FDIC, Federal Deposit Insurance Corporation, 5 Sheets.

Liberman et al., Market Watch, "How Important are Banks?" FDIC Insurance on Deposits Just One Continuing Advantage, Oct. 17, 2006, 3 Sheets.

McReynolds et al. "Unusual Products for Unusual Times," Securities Data Publishing on Wall Street, 6 Sheets, May 1, 2001.

McReynolds, "The Power of Cash: Ho-hum cash can be great product (and lead to more business) in troubled times," Securities Data Publishing on Wall Street, 3 Sheets, Jun. 1, 2002.

Merriam-Webster Online Dictionary, 10th Edition, Definition of "Associated", Jan. 30, 2009, 2 Sheets.

Merrill Lynch & You, "Financial Services the Way You Want, When You Want Them," Jan. 2000 4 Sheets.

Merrill Lynch Announces Beyond Banking, The Power of Advice for Smarter Cash Management, Jan. 8, 2 Sheets.

Merrill Lynch, Pierce, Fenner & Smith Incorporated, "Information Statement," 2000, 12 Sheets.

Merrill Moves CMA Cash to Bank, Street Talk, on Wall Street, Nov. 2000, p. 26.

Money Fund Report, Bank of New York Adds Insured Sweeps Option, Friday, May 3, 2002, The Reserve Funds, 1 Sheet.

Money Fund Report, IBC Financial Data, Inc., Nov. 6, 1998, 1 Sheet.

Money Fund Report, Insured Cash Sweep Options Proliferate, Friday, Jun. 1, 2001, The Reserve Funds, 1 Sheet.

Money Market Insight's, Goldman Sachs May Create Bank to Offer Insured Cash Sweeps, Aug. 2002 Issue, 3 Sheets.

Munk, Merrill Makes New Push Into Traditional Banking, Dow Jones Newswires, Jan. 3, 2003, 1 Sheet.

Mutual Fund Dealers Association, 1 page, (http://www.mfda.ca/.

Mutual Funds Magazine, Bargain Basement Funds, Oct. 1997, 1 Sheet.

Mutual Funds Magazine, Bargain Basement Funds, Oct. 1997, 2 Sheets.

News Article: "Regulators Support Demand Deposit Bill", Regulatory Compliance Watch—Mar. 9, 1998; 2 Sheets, vol. 9, No. 10.

Northbrook Bank & Trust Company, Introducing our MaxSafe CD with up to $700,000 of FDIC Insurance, 4 Sheets.

Northbrook Bank & Trust Company, Seven Times the Security of a Normal CD, Introducing our MaxSafe CD, Nov. 12, 2002, 4 Sheets.

O'Brian, "Money-Market Funds Suit Many Investors, But Proud Creator Frets About Extra Risk," Re-Printed From the Wall Street Journal, Monday, Nov. 6, 2000, Dow Jones & Company, Inc., Nov. 25, 2002, 2 Sheets.

On Wall Street, Helping Brokers Build a More Successful Business, The Power of Cash, Jun. 2002, 2 Sheets.

On Wall Street, Helping Brokers Build a More Successful Business, Unusual Products for Unusual Times, May 2001, 2 Sheets.

Online, www.usabancshares.com, Brave New World, 1999, 2 Sheets.

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.

Potter, "As Sweep Accounts Continue to Grow, So do Community Bank Options," America's Community Banker, vol. 9, Issue 8, Bell & Howell Information and Learning Company, 3 Sheets, Aug. 1, 2000.

Promontory Interfinancial Network, Promontory Interfinancial Network Announces New Deposit Placement Service, Jan. 21, 2003, 3 Sheets.

Promontory Interfinancial Network: http://www.promnetwork.com/index.html, 2003.

Promontory Interfinancial Network: Frequently Asked Questions (FAQs), Feb. 5, 2003, 5 pages.

Promontory to Roll Out Deposit Service Insuring Liquid Funds, American Banker, by Joe Adler, Feb. 22, 2010, 2 sheets.

Reserve Insured Deposits, United States Patent and Trademark Office, Reg. No. 2,694,910, Registered Mar. 11, 2003, 1 Sheet.

(56) References Cited

OTHER PUBLICATIONS

Reserve Management Corporation, Reserve Insured Deposits, U.S. Appl. No. 76/315,600, Issued.
Ring, National /Global, "Amex Spans the Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of the Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwritting, From: Denise Russo, Director, Underwritting, 6 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Fund, Study of U.S. Patent No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer the Reserve Return Sweep, for Immediate Release, Mar. 8, 2001, 2 Sheets.
The Reserve, "Company History," Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
The Unmatched Sweep Solution From the Cash Management Expert, 2 Sheets.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total-Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, 2 Sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Patent #4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: a First City-Austin deposit program to hold existing customers' deposits, Mar. 17, 1988, 7 pgs.
Insured Savings Remote Site Sweep Procedures, 3 pgs.

(56) References Cited

OTHER PUBLICATIONS

Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, Jul. 17, 1990, 1 pg.
Addendum to Insured Savings Agency Agreement, Jul. 17, 1990, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.
Cash Management Balance Monitoring Agreement Form 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 Civ. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investors MoneyAccount$^{SM}$ and Insurance Plus Service Agreement, Schedule A, 3 sheets.
Investors MoneyAccount$^{SM}$ (an FDIC-insured money market account), 4 sheets.
Investors MoneyAccount$^{SM}$ The FDIC-Insured Money Market with an Important Plus., 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, 11 sheets.
First National Bank in Brookings, Certificates of Deposit, Jul. 17, 2009, 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, 6 FRC Monitor, Dec. 2003, 2 sheets.
Crane, P. & Krasner, Mike, An iMoney Net Special Report™, "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review © A Publication of *Meyer Weekly Interest Rate Survey*, A Look At Tiers, vol. II, No. 4, Apr. 1987, 6 pgs.
Interest Rate Review © A Publication of *Meyer Weekly Interest Rate Survey*, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.

Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch, Information Statement Regarding Changes to IntereSt Rates on Deposits in the Merrill Lynch Banks, Document 64-14, Nov. 12, 2007, Case 1:07-cv-00318, 2 sheets.
Street Talk, "Merrill Moves CMA Cash to Bank", *On Wall Street*, Nov. 2000, 1 sheet.
Quest Insured Account, *QUESTessentials*, 3 sheets.
Quest Insured Account, *Information Statement*, 5 sheets.
OCC Insured Bank Deposit Account, 3 sheets.
Insured Bank Deposit Account, *Information Statement*, Jul. 1, 2000, 2 sheets.
Letter from Marilyn J. Hensle, announcing Salomon Smith Barney Bank Deposit Program.$^{SM}$, with Q&A, 14 sheets.
Bank Deposit program Disclosure Statement, *Salomon Smith Barney*, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 18 pgs.
The Insured Savings Account, Issuer Guide to Offering MMDAs through Merrill Lynch, 27 pgs.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney Insured Deposit Account, 1995, 8 pgs.
Memorandum from Ted Hamilton re: Insured Deposit Account, Oct. 10, 1995, 13 pgs.
The Insured Deposit Account: "*Money in the Bank*", 1997, 2 sheets.
Merrill Joins Money Market Account, CMA; Broker Begins Testing With 12 Institutions, *Lexis Nexis*, Sep. 23, 1983, 4 pgs.
Form 8-K Merrill Lynch & Co Inc—MER, Filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial ability for banker's and their clients, 6 pgs.
Federally "Insured Deposit Program", AmVest Capital, 1 sheet.
Federally Insured Deposit Program for Banki, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.

(56) References Cited

OTHER PUBLICATIONS

Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured Deposit Program, Disclosure Statement, Jan. 15, 2010, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC. PLUS Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denision Company, Sheboygan, WI, 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.leqentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, 2 sheets.
Customer Agreement, Cleared Through Legent Clearing, 3 pgs.
Cash Management, Mesirow Financial—B/D and IA Services, www.mesirowfinancial.com/bdia/cas_mqmt.isp, Jan. 15, 2010, 2 sheets.
Frequent Asked Questions: FDIC Sweep Program, optionsXpress, www.optionsxpress.com/welcom/faq/aq/fdc.aspx#rate.
Terms & Conditions for optionsXpress' Bank Insured Deposit Program, optionsXpress, 6 pgs.
Frequently Asked Questions: FDIC Sweep Program, optionsXpress, www.optionsxpress.com/welcom/faq/fdic.aspx Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, 12 pgs.
Insured deposit account program disclosure booklet, 16 pgs.
Update New FDIC product at IPI: Deutsche Bank Insured Deposit Program, Investment Professionals Inc, Feb. 4, 2009, 11 pgs.
Insured cash account, http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, 3 pgs.
Insured deposit program, www.aigadvisorgroup.com/fdic/03.04.09.htm, Jan. 15, 2010, 3 pgs.
FlexInsured Account$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali/pcp/pages/products-services.aspx, Nov. 4, 2009, 2 sheets.
Terms and conditions for cash sweep, sterne agee, 2 sheets.
Client account agreement to Sterne Agee Clearing, INC, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
A sweet suite of business products brings our bank to you, AndroscogginBank, www.androscogginbank.com, 1 sheet.
We have your banking nees covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank www.eastwestbank.com/english/FDIC.asp, Nov. 10, 2009, 1 sheet.
Safe sound secure insured deposit programs, East West Bank, www.eastweatbank.com/English/SS_SIDPrograms.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.

(56) References Cited

OTHER PUBLICATIONS

Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12,5 million of FDIC deposit insurance available, Insured Deposit Program, Deutsche Bank, www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, 2 sheets.
Insured deposit online, The Insured Deposit Program, Evolve Bank & Trust, 2 sheets.
Insured deposit online, Frequently asked questions, Evolve Bank & Trust, www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Up to $10 million of FDIC deposit insurance available, Insured Deposit Program, Pulaski Bank, 1 sheet.
Personal Banking, Insured Deposit Program, Pulaski Bank www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, 1 sheet.
Up to $12.5 million of FDIC deposit insurance available, Insured Deposit Program, Pulaski Bank, 1 sheet.
Who can benefit from the insured deposit program?, Insured Deposit Program, Pulaski Bank, 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Deposit Institutions, sheets. www.totalbanksolutions.com/deposit.cfm Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, Dennis C. Borecki, President, TBS Bank Deposit Account, 7 pgs.
Christopher McCrum, LinkedIn, http://74.125.93.132/search?=cache:5hs9cebUSjgJ:www.linkedin.com/pub/christopher-mccrum/. . . , Nov. 2, 2009, 2 sheets.
Kentucky Bankers Association, Alternative for excess deposit coverage FREE Webiners, http://209.235.145/cgi-bin/websuite/tcsassnwebsuite.pl? . . . , Nov. 2, 2009, 2 sheets.
Kentucky Bankers Association Detailed listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_gn4182/is_20081128/ai_n31055289/, Nov. 2, 2009, 2 sheets.
Fast fax-back reply, Kentucky Bankers Association, 1 sheet.
Deutsche Bank, Deutsche Bank insured deposit program, 3 pgs.
Deutsche Bank Insured Deposits, Bank list as of Dec. 18, 2009, 1 sheet.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept. www.cranedata.us/archives/news/2009/10/, Nov. 3, 2009, 14 pgs.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).
Lawsuit by Island Intellectual Property LLC and Intrasweep LLC against Institutional Deposits Corp., Defendant Institutional Deposits Corp.'s Preliminary Invalidity Contentions, Case No. 09-CV-03079-JEC.

(56) References Cited

OTHER PUBLICATIONS

Exhibit 1, Invalidity Chart: IMA and Insurance Plus Service Agreement, U.S. Patent No. 7,509,286, 21 pgs..
Exhibit 2, Invalidity Chart: Investors Money AccountSM System, U.S. Patent No. 7,509,286, 26 pgs.
Exhibit 3, Invalidity Chart: Insured Money Account System, U.S. Patent No. 7,509,286, 26 pgs.
Exhibit 4, Invalidity Chart: U.S. Patent No. 4,985,833 (Oncken), U.S. Patent 7,509,286, 21 pgs.
Exhibit 5, Invalidity Chart: First City Bank of Texas' Insured Savings Program, U.S. Patent No. 7,509,286, 39 pgs.
Exhibit 6, Invalidity Chart: Quest Insured Account, U.S. Patent No. 7,509,286, 19 pgs.
Exhibit 7, Invalidity Chart: CIBC World Markets—Insured Bank Deposit Account, U.S. Patent No. 7,509,286, 16 pgs.
Exhibit 8, Invalidity Chart: Merrill Lynch CMA/ISA Service, U.S. Patent No. 7,509,286, 72 pgs.
Exhibit 9, Invalidity Chart: 1983 Fed Letter, U.S. Patent No. 7,509,286, 16 pgs.
Exhibit 10, Invalidity Chart: Merrill Lynch Banking Advantage Program ("MLBA Program"), U.S. Patent No. 7,509,286, 22 pgs.
Exhibit 11, Invalidity Chart: Merrill Lynch & You + MLBA Information Statement, U.S. Patent No. 7,509,286, 18 pgs.
Exhibit 12, Invalidity Chart: Smith Barney Insured Deposit Account, U.S. Patent No. 7,509,286, 22 pgs.
Exhibit 13, Invalidity Chart: Smith Barney Bank Deposit Program, U.S. Patent No. 7,509,286, 18 pgs.
Exhibit 14, Invalidity Chart: Alliance Insured Account, U.S. Patent No. 7,509,286, 16 pgs.
Exhibit 15, Invalidity Chart: Reserve's American Express Presentation, U.S. Patent No. 7,509,286, 16 pgs.
Exhibit 16, Invalidity Chart: U.S. Patent No. 7,376,606 (Jacobsen), U.S. Patent No. 7,536,350, 6 pgs.
Exhibit 17, Obviousness Combinations Chart, U.S. Patent No. 7,509,286, 351 pgs.
Hencke, Christopher; New Rules for FDIC Deposit Insurance; ABA Bank Compliance, Jul./Aug. 1999, 20,7; pp. 31-37.
Campbell, Andrew, et al.; A new standard for deposit insurance and government guarantees after the crisis; Journal of Financial Regulation and Compliance, vol. 17 No. 3, 2009; pp. 210-239.
Cynamon et al.; Redefining the Monetary Aggregates: A Clean Sweep; Eastern Economic Journal, vol. 32, No. 4, Fall 2006; pp. 661-672.
USPTO non-final action on U.S. Appl. No. 13/829,974 mailed Jun. 3, 2013; 7 pages.
USPTO non-final action on U.S. Appl. No. 13/830,143 mailed Jun. 20, 2013; 52 pages.

\* cited by examiner

SYSTEMS AND METHODS FOR MONEY FUND BANKING WITH FLEXIBLE INTEREST ALLOCATION

RELATED APPLICATIONS

This application claims priority from Provisional Application U.S. Application 61/384,576, filed Sep. 20, 2010, which is incorporated herein by reference in its entirety for all purposes.

FIELD OF THE INVENTION

The present invention generally relates to a system, method and program product for administering fund movements, such as sweep programs, and fund exchange programs.

SUMMARY

In embodiments, a method comprises: accessing, using one or more computers, one or more electronic databases, stored on one or more computer-readable media, comprising: (i) aggregated account information for a plurality of government backed-insured and interest-bearing aggregated deposit accounts held in a plurality of program institutions participating in a program; (ii) source institution deposit information including (1) time data on when a deposit was received into the system for deposit into interest-bearing aggregated deposit accounts held in one or more of the program institutions and/or how long the deposit has been managed by the program; and (2) an amount of the deposit; obtaining transfer data, using the one or more computers, describing a deposit/transfer of funds to or a withdrawal/transfer of funds from the program by a source institution; obtaining time dimension interest rate data for a period of time for the deposit or the withdrawal of funds, wherein the time dimension interest rate varies depending on how long the deposit has been held in one or more other of the recipient institutions participating in the program; allocating the deposit funds to one or more other of the recipient institutions (not including the source institution) participating in the program for deposit in one or more aggregated deposit accounts held therein on behalf of the source institution, or allocating a withdrawal of funds from one or more recipient institutions to satisfy a withdrawal on behalf of the source institution; generating data for instructions, to deposit/transfer funds and/or to withdraw/transfer funds to or from one or more of the aggregated deposit accounts in one or more of the recipient institutions, based at least in part on the deposit/transfer data and/or the withdrawal/transfer data and based at least in part on the allocating step; calculating, using the one or more computers, or having calculated using one or more computers, for funds of each of one or more source institutions, a respective interest amount for funds of the respective source institutions held in the one or more aggregated deposit accounts of one or more of the recipient institution, for the period of time, based at least in part, on the time data relating to how long the source funds have been held in one or more of the recipient institutions participating in the program and the time dimension interest rate for the period of time; generating data for allocating interest for source funds of the source institution based, at least in part, on the calculated interest amount for the respective source funds; and updating, using the one or more computers, the one or more databases to reflect the added interest.

In embodiments, the funds to be transferred in a deposit have a source interest rate, and the interest rate applied for one or more of the recipient institutions for funds is different from the source interest rate, and further comprising allocating, using the one or more computers, at least a matching amount of funds to the source institution, wherein the source institution has agreed to pay at least the source interest rate on these funds to the source institution.

In embodiments, the one or more databases further comprise client account information for each of the respective client accounts comprising: (1) data for the respective client account relating to a time parameter for a length of time funds are to be held in the aggregated deposit accounts in recipient institutions participating in the program, and (2) a respective balance of funds from the respective client account held in each of the one or more government backed-insured and interest-bearing aggregated deposit accounts holding funds of the respective client account; and further comprising: calculating, using the one or more computers, or having calculated using one or more computers, a respective interest amount for multiple of the client accounts based on their respective client data, and communicating electronically the respective interest determined for each of the multiple of the respective client transaction accounts based on the funds of the respective client account held in the one or more aggregated deposit accounts; and updating, using the one or more computers, the one or more databases to reflect the interest added.

In embodiments, a step of operation is performed of determining a lump sum amount to be included with the determined interest amount based at least in part on the amount of the deposit.

In embodiments, the allocating step further comprises selecting one or more of the recipient institutions based at least in part on an interest rate the respective recipient institution is willing to pay for funds.

In embodiments, the allocating step further comprises selecting one or more of the recipient institutions based at least in part on an amount of funds the respective recipient institution has deposited for management under the program and is held in other recipient institution participating in the program.

In embodiments, the allocating step further comprises selecting one or more of the recipient institutions based at least in part a credit-worthiness of the respective recipient institution.

In embodiments, the funds of the source institution to be deposited or to be withdrawn are time deposit funds.

In embodiments, there are a plurality of banks in the program, with each of the plurality of banks having at least one of the aggregated deposit accounts.

In embodiments, the obtaining transfer data comprises receiving over one or more electronic networks sweep files containing the transfer data.

Some embodiments, further comprises transferring or having transferred, using one or more computers and one or more electronic networks, funds based at least in part on the data for instructions to deposit/transfer funds and/or to withdraw/transfer funds to or from one or more of the aggregated deposit accounts in one or more of the recipient institutions.

In embodiments, a method comprises: accessing, using one or more computer, one or more electronic databases, stored on one or more computer-readable media, comprising: (i) aggregated account information for one or more government backed-insured and interest-bearing aggregated deposit accounts held in one or more recipient institutions in a program, wherein funds from client accounts of a plurality of clients are held with funds of other client accounts in the one or more aggregated deposit accounts held in the one or more institutions in the program; and (ii) client account information for each of the respective client accounts comprising: (1) a respective client balance of funds held in the one or more interest-bearing aggregated deposit accounts held in the one or more institutions in the program; (2) data for the respective client account relating to a time parameter for a length of time funds are to be held in the aggregated deposit accounts in recipient institutions participating in the program, (3) a respective balance of funds from the respective client account held in each of the one or more government backed-insured and interest-bearing aggregated deposit accounts holding funds of the respective client account; obtaining, using the one or more computers, data directly or indirectly from one or more clients or on their behalf describing a deposit to or a withdrawal from the one or more client accounts; allocating the deposit funds to one or more of the recipient institutions participating in the program for deposit in one or more aggregated deposit accounts held therein based at least in part on the client deposit and/or withdrawal data, or allocating a withdrawal of funds from one or more recipient institutions to satisfy a withdrawal on behalf of the source institution based at least in part on the client deposit and/or withdrawal data; determining or obtaining from the database and/or from another source, using the one or more computers, for each of the plurality of the respective client accounts a respective interest rate based on at least a two-dimensional tiering, so that some different clients' accounts having funds in the one or more aggregated deposit accounts, are accorded different interest rates, wherein the two-dimensional tiering comprises assigning a particular interest rate for the respective period of time, to the respective client account if the respective client balance of funds in the one or more aggregated deposit accounts holding funds of the respective client account is within a balance range for an entire prescribed period of time; calculating, using the one or more computers, or having calculated using one or more computers, for each of one or more of the client accounts, a respective interest amount for funds of the respective client account held in the one or more aggregated deposit accounts, for the prescribed time period based at least in part on the respective interest rate for the respective client account and the balance of funds of the respective client account in one or more of the aggregated deposit accounts; calculating, using the one or more computers, or having calculated using one or more computers, for each of a different one or more of the client accounts determined to have another interest rate not based on the two-dimensional tiering, a respective interest amount based at least in part on the respective other interest rate for the respective client account and the balance of funds of this respective client account in one or more of the aggregated deposit accounts; communicating or having communicated the data on calculated interest amounts for the respective client accounts with funds held in the one or more aggregated deposit accounts in the program; and updating, using the one or more computers, the one or more databases to reflect the added interest.

In embodiments, the which interest rate for the funds increases progressively from time period to time period.

In embodiments, there are a plurality of recipient institutions and a plurality of aggregated deposit accounts.

In embodiments, the two-dimensional tiering is implemented with a plurality of tiering tables, with each tiering table for a different prescribed time period.

In embodiments, a third set of tiering tables for implementing an additional tiering parameter is also used for determining the interest rate.

In embodiments, a step is further provided of transferring or having transferred, using one or more computers and one or more electronic networks, funds based at least in part on the allocating step.

In embodiments, a method comprises: accessing, using one or more computers, one or more databases stored on one or more computer-readable media, comprising: (i) aggregated account information for a plurality of government backed-insured and interest-bearing aggregated deposit accounts held in a plurality of recipient institutions participating in a program, (ii) source institution deposit information comprising (1) time data on when a deposit was received for deposit into one or more of the interest-bearing aggregated deposit accounts held in one or more of the recipient institutions and/or how long the deposit has been held in one or more of the aggregated deposit accounts in one or more of the recipient institutions participating in the program, (2) a term interest rate for the deposit, and (3) an amount of the deposit; obtaining an order into the system from a source institution to distribute term deposit funds with a term deposit interest rate and a term period to one or more other recipient institutions participating in the program; allocating, using the one or more computers, one or more tranches of the term deposit funds from the source institution to one or more recipient institutions to one or more aggregated deposit accounts held therein, wherein the interest rate applied for one or more of the recipient institutions for funds allocated of the deposit is different from the term interest rate; allocating, using the one or more computers, at least a matching amount of funds to the source institution that has agreed to pay at least the term rate on these allocated funds; determining, using the one or more computers, whether the term deposit funds sourced to the one or more of the aggregated deposit accounts were maintained or may be maintained in other of the recipient institutions participating in the program for the full term period; generating and communicating data, using the one or more computers, to allocate an amount of interest to the source institution that is based at least part on the term deposit interest rate for the term deposit funds, if the term funds have been maintained in other of the recipient institutions participating in the program for the full term period; generating and communicating data, using the one or more computers, to allocate an amount representing a lower interest rate, or allocating no interest, or allocating interest calculated at other than the term interest rate, to the source institution, if the term funds have not been maintained in other of the recipient institutions participating in the program for the full term period; and updating, using the one or more computers, the one or more databases to reflect the added interest.

In embodiments, the one or more databases further comprise (iii) client account information for multiple client accounts comprising: (1) a respective client balance of funds held in the one or more government backed-insured and interest-bearing aggregated deposit accounts held in the recipient institutions; and/or (2) a respective balance of funds from the respective client account held in each of the one or more insured and interest-bearing aggregated deposit accounts holding funds of the respective client account.

In embodiments, further steps are provided of transferring or having transferred, using one or more computers and one or more electronic networks, funds based at least in part on one or more of the allocating steps.

In embodiments, a computer system comprises: one or more computers comprising memory wherein the memory stores computer-readable instructions that, when executed, cause the one or more computers to perform the steps: accessing, using one or more computer one or more electronic databases, stored on one or more computer-readable media, comprising: (i) aggregated account information for a plurality of government backed-insured and interest-bearing aggregated deposit accounts held in a plurality of program institutions participating in a program; (ii) source institution deposit information including (1) time data on when a deposit was received into the system for deposit into interest-bearing aggregated deposit accounts held in one or more of the program institutions and/or how long the deposit has been managed by the program; and (2) an amount of the deposit; obtaining transfer data, using the one or more computers, describing a deposit/transfer of funds to or a withdrawal/transfer of funds from the program by a source institution; obtaining time dimension interest rate data for a period of time for the deposit or the withdrawal of funds, wherein the time dimension interest rate varies depending on how long the deposit has been held in one or more other of the recipient institutions participating in the program; allocating the deposit funds to one or more other of the recipient institutions (not including the source institution) participating in the program for deposit in one or more aggregated deposit accounts held therein on behalf of the source institution, or allocating a withdrawal of funds from one or more recipient institutions to satisfy a withdrawal on behalf of the source institution; generating data for instructions, using the one or more computers, to deposit/transfer funds and/or to withdraw/transfer funds to or from one or more of the aggregated deposit accounts in one or more of the recipient institutions, based at least in part on the deposit/transfer data and/or the withdrawal/transfer data and based at least in part on the allocating step; calculating, using the one or more computers, or having calculated using one or more computers, for funds of each of one or more source institutions, a respective interest amount for funds of the respective source institutions held in the one or more aggregated deposit accounts of one or more of the recipient institution, for the period of time, based at least in part, on the time data relating to how long the source funds have been held in one or more of the recipient institutions participating in the program and the time dimension interest rate for the period of time; generating data, using the one or more computers, for allocating interest for source funds of the source institution based, at least in part, on the calculated interest amount for the respective source funds; and updating, using the one or more computers, the one or more databases to reflect the added interest.

In embodiments, a computer system comprises: one or more computers comprising memory wherein the memory stores computer-readable instructions that, when executed, cause the one or more computers to perform the steps: accessing, using one or more computer one or more electronic databases, stored on one or more computer-readable media, comprising: (i) aggregated account information for one or more government backed-insured and interest-bearing aggregated deposit accounts held in one or more recipient institutions in a program, wherein funds from client accounts of a plurality of clients are held with funds of other client accounts in the one or more aggregated deposit accounts held in the one or more institutions in the program; and (ii) client account information for each of the respective client accounts comprising: (1) a respective client balance of funds held in the one or more interest-bearing aggregated deposit accounts held in the one or more institutions in the program; (2) data for the respective client account relating to a time parameter for a length of time funds are to be held in the aggregated deposit accounts in recipient institutions participating in the program; (3) a respective balance of funds from the respective client account held in each of the one or more government backed-insured and interest-bearing aggregated deposit accounts holding funds of the respective client account; obtaining, using the one or more computers, data directly or indirectly from one or more clients or on their behalf describing a deposit to or a withdrawal from the one or more client accounts; allocating, using the one or more computers, the deposit funds to one or more of the recipient institutions participating in the program for deposit in one or more aggregated deposit accounts held therein based at least in part on the client deposit and/or withdrawal data, or allocating a withdrawal of funds from one or more recipient institutions to satisfy a withdrawal on behalf of the source institution based at least in part on the client deposit and/or withdrawal data; determining or obtaining from the database and/or from another source, using the one or more computers, for each of the plurality of the respective client accounts a respective interest rate based on at least a two-dimensional tiering, so that some different clients' accounts having funds in the one or more aggregated deposit accounts, are accorded different interest rates, wherein the two-dimensional tiering comprises assigning a particular interest rate for the respective period of time, which interest rate increases progressively from time period to time period, to the respective client account if the respective client balance of funds in the one or more aggregated deposit accounts holding funds of the respective client account is within a balance range for an entire prescribed period of time; calculating, using the one or more computers, or having calculated using one or more computers, for each of one or more of the client accounts, a respective interest amount for funds of the respective client account held in the one or more aggregated deposit accounts, for the prescribed time period based at least in part on the respective interest rate for the respective client account and the balance of funds of the respective client account in one or more of the aggregated deposit accounts; calculating, using the one or more computers, or having calculated using one or more computers, for each of a different one or more of the client accounts determined to have another interest rate not based on the two-dimensional tiering, a respective interest amount based at least in part on the respective other interest rate for the respective client account and the balance of funds of this respective client account in one or more of the aggregated deposit accounts; communicating or having communicated the data on calculated interest amounts for the respective client accounts with funds held in the one or more aggregated deposit accounts in the program; and updating, using the one or more computers, the one or more databases to reflect the added interest.

In embodiments, a computer system comprises: one or more computers comprising memory wherein the memory stores computer-readable instructions that, when executed, cause the one or more computers to perform the steps: accessing, using one or more computer one or more electronic databases, stored on one or more computer-readable media, comprising: (i) aggregated account information for a plurality of government backed-insured and interest-bearing aggregated deposit accounts held in a plurality of recipient institutions participating in a program, (ii) source institution deposit information comprising (1) time data on when a deposit was received for deposit into one or more of the interest-bearing aggregated deposit accounts held in one or more of the recipient institutions and/or how long the deposit has been held in one or more of the aggregated deposit accounts in one or more of the recipient institutions participating in the program, (2) a term interest rate for the deposit, and (3) an amount of the deposit; obtaining an order into the system from a source institution to distribute term deposit funds with a term deposit interest rate and a term period to one or more other recipient institutions participating in the program; allocating, using the one or more computers, one or more tranches of the term deposit funds from the source institution to one or more recipient institutions to one or more aggregated deposit accounts held therein, wherein the interest rate applied for one or more of the recipient institutions for funds allocated of the deposit is different from the term interest rate; allocating, using the one or more computers, at least a matching amount of funds to the source institution that has agreed to pay at least the term rate on these allocated funds; determining, using the one or more computers, whether the term deposit funds sourced to the one or more of the aggregated deposit accounts were maintained or may be maintained in other of the recipient institutions participating in the program for the full term period; generating and communicating data, using the one or more computers, to allocate an amount of interest to the source institution that is based at least part on the term deposit interest rate for the term deposit funds, if the term funds have been maintained in other of the recipient institutions participating in the program for the full term period; generating and communicating data, using the one or more computers, to allocate an amount representing a lower interest rate, or allocating no interest, or allocating interest calculated at other than the term interest rate, to the source institution, if the term funds have not been maintained in other of the recipient institutions participating in the program for the full term period; and updating, using the one or more computers, the one or more databases to reflect the added interest.

BRIEF DESCRIPTION OF THE DRAWINGS

The above and related objects, features and advantages of the present invention, will be more fully understood by reference to the following detailed description of the exemplary embodiments of the present invention, when taken in conjunction with the following exemplary figures, wherein.

DETAILED DESCRIPTION

The contents of the following patents, U.S. Pat. No. 7,752, 107, U.S. Pat. No. 7,668,772; U.S. Pat. No. 7,509,286; U.S. Pat. No. 7,752,129; U.S. Pat. No. 7,519,551; U.S. Pat. No. 7,536,350; and U.S. Pat. No. 6,374,231 and application Ser. No. 13/228,031 are incorporated herein by reference in their entirety.

The present invention discloses a deposit management system (DMS), a method, and a program product for implementing a deposit sweep program and/or fund exchange program for accommodating banks and other types of financial entities. In this system, the deposit sweep program includes source institutions, recipient institutions, and intermediaries, among others.

In embodiments of the present invention, the deposit management system may obtain a source transaction for a period, e.g., one or more hours, one or more days, one or more weeks, etc., for a given financial institution that operates as both a source institution to send funds out to the deposit management system and a recipient depository institution that receives funds in from the deposit management system. The deposit management system may then obtain recipient transaction for this given financial institution based on one or more parameters. The deposit management system then nets the source transaction amount for the period ("a first amount") with a recipient amount for the period ("a second amount"), to obtain a net amount for the period. The financial institution and/or the deposit management system may perform or have performed or facilitate performance of an internal book transfer to match the first amount with the second amount to effectuate a process to minimize the number of fund transfers required. In embodiments, the system may also adjust the amount of funds to be received by the financial entity as a recipient depository institution (the net amount) to avoid wire transfers completely when one or more parameters are met, such as the net amount be less than some predetermined amount (e.g., $100, $1,000, etc.), thus avoiding even one wire transfer fee in a given period, e.g., one or more hours, one or more days, one or more weeks, etc.

Figure 1A:
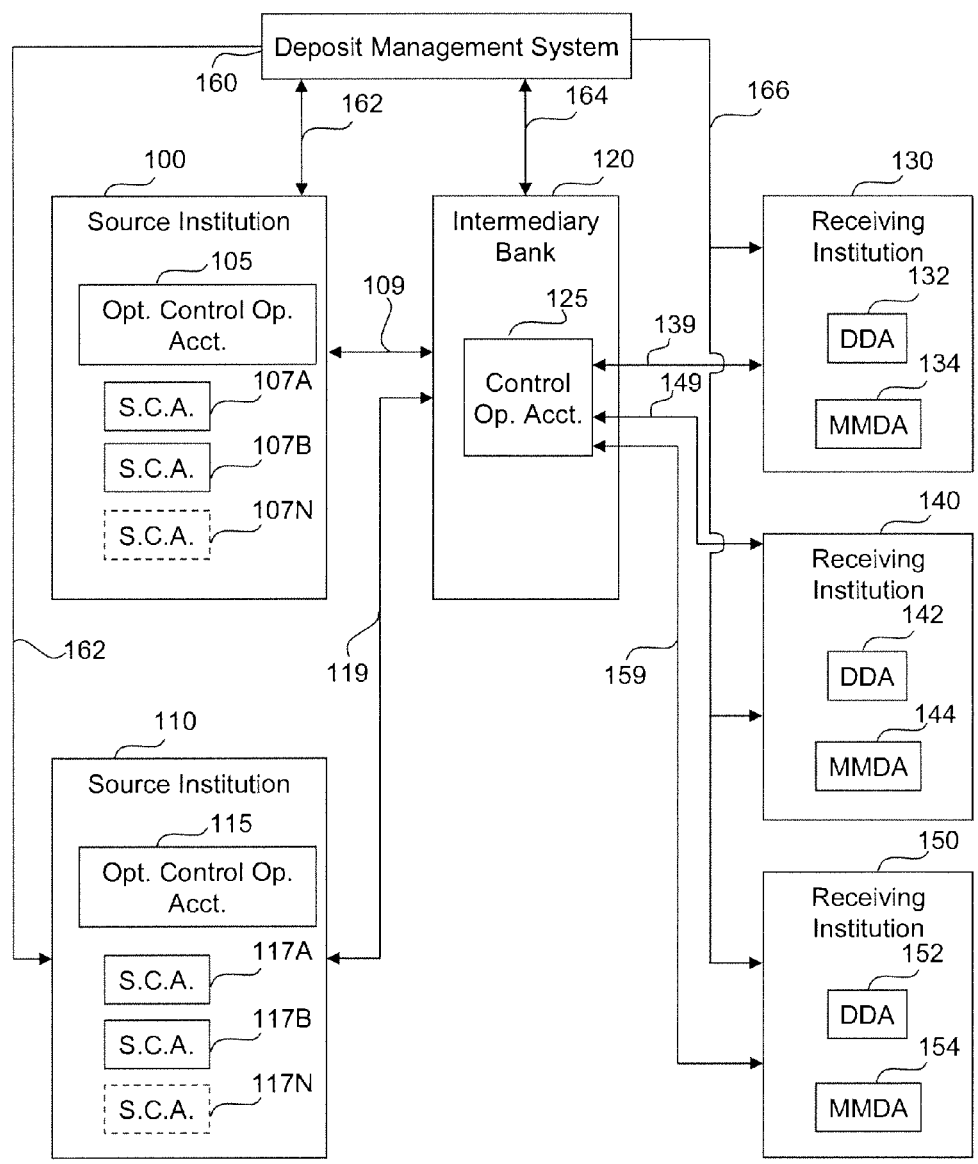
FIG. 1A is a schematic block diagram of an exemplary system in accordance with embodiments of the invention.
Figure 1B:
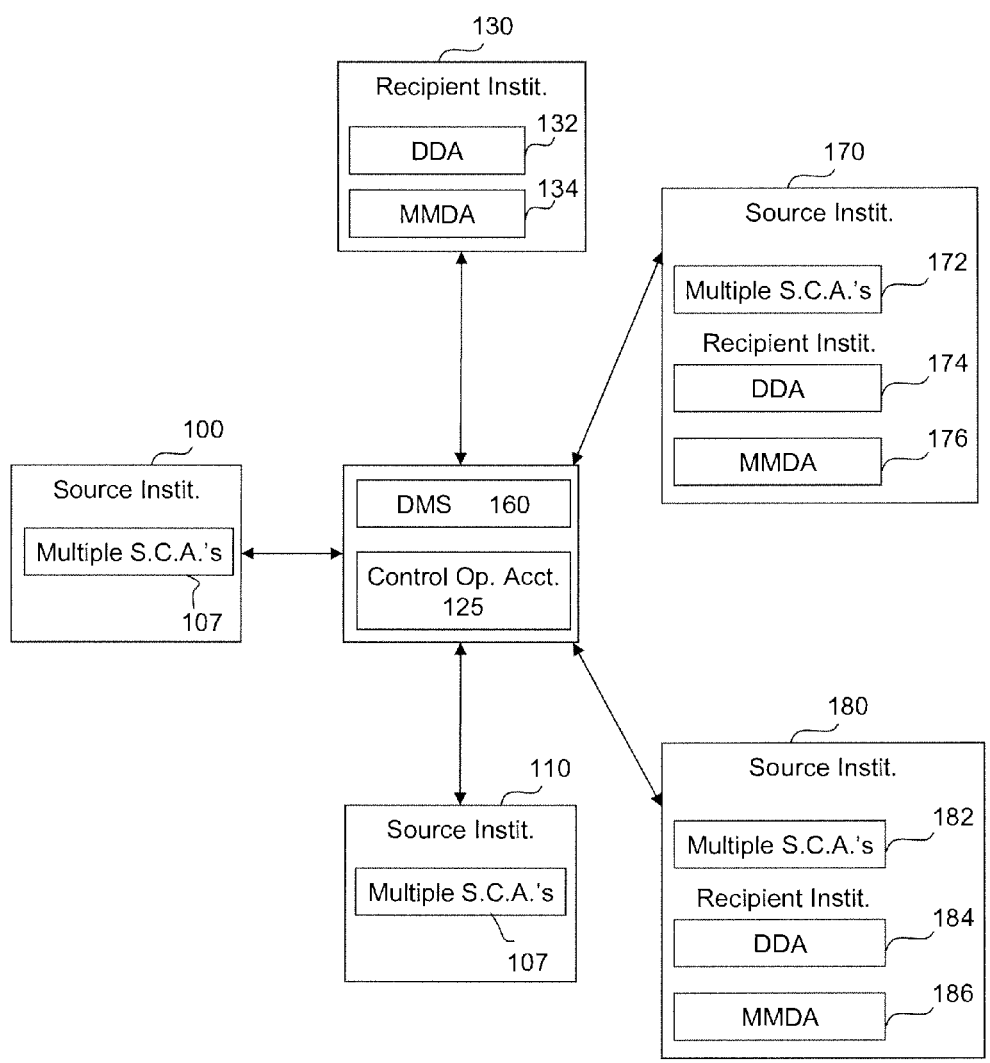
FIG. 1B is a schematic block diagram of an exemplary system in accordance with embodiments of the invention.
Figure 1C:
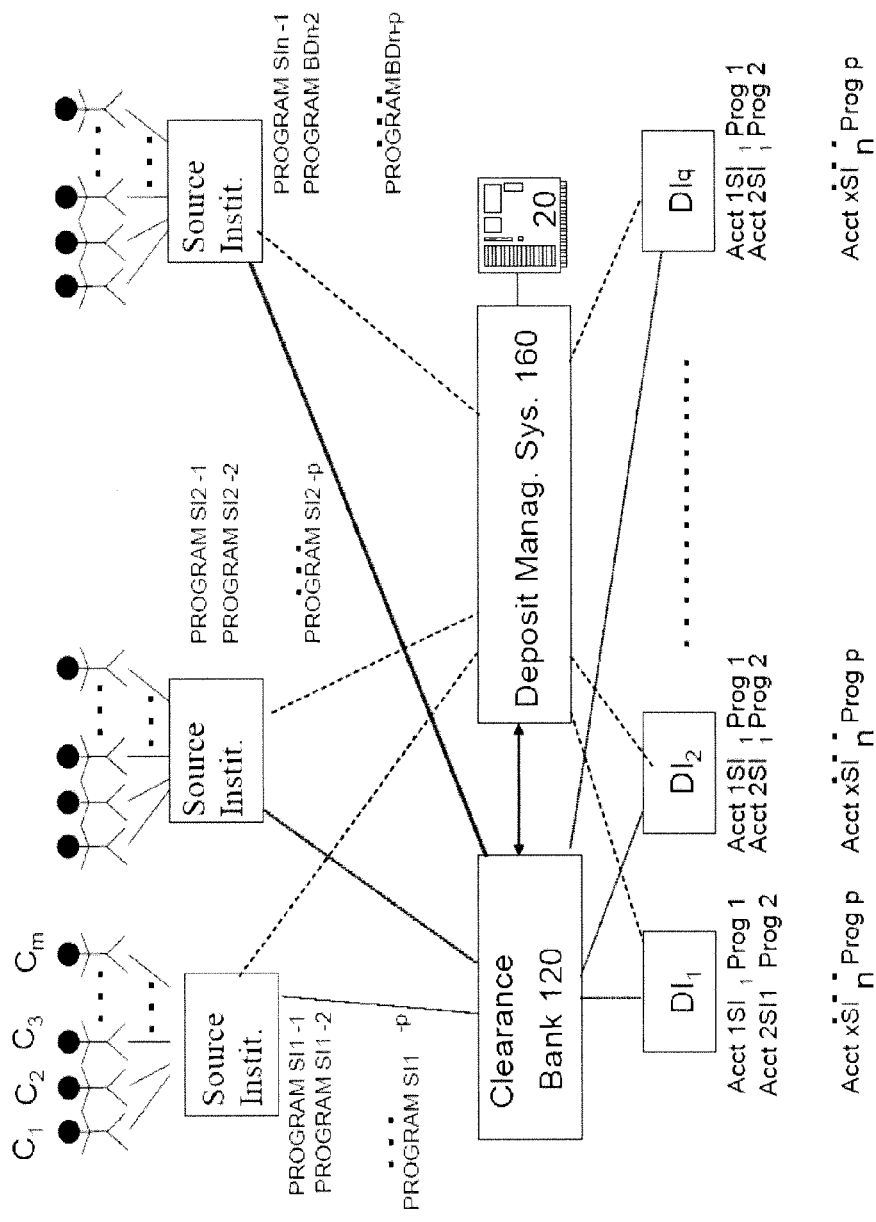
FIG. 1C is a schematic block diagram of an exemplary system in accordance with embodiments of the invention.

In a typical deposit sweep system, one or more financial entities FE may participate in a program, which comprises source institutions and recipient institutions. In embodiments, there may also be intermediate institutions. FIGS. 1A, 1B and 1C illustrate exemplary embodiments of various kinds of deposit sweep programs. As discussed below, some financial institutions may play one or more roles, or multiple financial institutions may be the same role.

Source institutions may, by way of example, be banks, credit unions, registered investment advisors, broker dealers, asset managers, and other types of financial institutions, to name a few. Typically, the source institutions are the institutions that interact with the clients that are placing or authorizing the respective clients' funds to go into and/or be managed by the deposit management system. Note that a source institution can include one or more clearing institutions for other source institutions, investment advisors, and/or intermediaries for other source institutions. These terms will be discussed below.

Recipient depository institutions are typically banks or other types of deposit institutions whose accounts are backed by some form of insurance, such as government-backed insurance, like Federal Deposit Insurance Corporation (FDIC) insurance in the case of banks, or the National Credit Union Share Insurance Fund (NCUSIF) in the case of credit unions, or by collateral. In embodiments, rather than using government backed insurance, some or all of the deposits may be backed by some form of collateral, such as a pledge of government securities 14 (e.g., U.S. Treasury or U.S. Agency obligations), state obligations or other collateral.

However, note that in embodiments some recipient depository institutions may hold financial instruments that are not insured.

One or more intermediary institutions may be used to facilitate the movement of funds between the source institution(s) and the recipient depository institution(s), and/or to perform various recordkeeping functions. Such intermediaries may perform record keeping and/or fund transfer functions, and may include a bank or clearance bank through which fund transfers may be facilitated, a clearing firm, an administrator that performs recordkeeping functions and/or provides data to facilitate fund transfers, and/or other entities that perform fund transfer or recordkeeping functions. Note that one or multiple entities may fulfill a single function or role and/or multiple functions or roles.

With respect to some types of source institutions, the source institution itself may clear its own client accounts or it may use another entity to clear its client accounts. If a source institution is a clearing entity, it may provide clearing services to other source institutions, such as broker-dealers, banks, financial advisors, financial intermediaries, to name a few. Such entities for which clearing services are performed by another entity are sometimes referred to as "correspondents." Under some guidelines, when a clearing entity is used to clear funds for one or more correspondents, the funds of the clearing entity and the one or more correspondents may be held together in an aggregated account such as an interest-bearing aggregated money market deposit account or an aggregated demand deposit account. In embodiments, the funds from each different correspondent may be segregated in a separate aggregated account.

In some deposit sweep systems, one entity may play the role of one or more of the above. For example, a source institution, such as a bank, may also be a recipient depository institution. Similarly, a source institution, like a broker-dealer, or a bank, may be affiliated with one or more of the recipient depository institutions. In embodiments, there may be no affiliation between the institutions, or an affiliation between only some of the institutions.

Further, the administrator may also be either a source institution, a recipient depository institution, a clearance bank, or another entity participating in deposit sweep functions. Further, in embodiments one entity may play part of one role and another part of another role. For example, when a bank is an intermediary it may be used to facilitate the transfer of funds, but also may be a source institution and/or a recipient depository institution. Such a bank, may or may not use a separate record keeper.

Likewise, a particular program may have one source institution or multiple source institutions. Similarly, a particular program may have one recipient depository institution or multiple recipient depository institutions.

A "program" comprises a deposit arrangement to make available government-backed insurance through one or more aggregated accounts, wherein such program can provide to account holders government-backed insurance in an amount greater than an insurance limit for funds held in a single depository institution, through the use of a plurality of government backed insured and interest-bearing aggregated deposit accounts, with the aggregated deposit accounts in different program depository institutions. Each program may include one or more insured deposit products, with one or more of the programs having different attributes, such as different insurance levels, different tier options and rates paid, and services, to name a few. In embodiments, the rates paid may be determined by such factors as the balance in the client's insured account, or may be determined by the total value of the client's brokerage account, or may be determined by the total value of a group of accounts for a particular household together, or may be determined by relationship pricing based on the number of products a client uses though a source institution (SI) or affiliated source institutions, to name a few. Each source institution may have a plurality of client accounts, S.C.A.'s, that invest in particular products that make up part of a particular program. The client accounts, S.C.A., may be for individuals or corporations or government entities, $C_1, C_2, C_3, C_m$, or any other form of entity. Thus, for example, as illustrated in FIG. 1C, a source institution may manage a number of programs PROGRAM SI1-1, PROGRAM SI1-2, . . . PROGRAM SI1-$p$, where each client account, S.C.A., of the source institution SI1 invests in at least one of the products under at least one of the programs PROGRAM SI1-1-PROGRAM SI1-$p$. Examples of different kinds of programs that may be offered, include a program with cash management services, a program for high net worth individuals with a higher minimum balance requirement, a program paying a lower rate and offering more services, a no frills program with a higher rate and no services where for a fee, the client may get other services, to name a few. Note that in embodiments, a program may also manage some client funds that are held in investment instruments that are not government-backed insured instruments.

Each source institution may have one or more programs of its own, and/or may participate in one or more programs of other institutions. Each client may participate in one or more programs from a single source institution, or may participate in several different programs. Also, multiple source institutions can participate in the same program. The same recipient depository institution may participate in different programs with the same or for different source institutions.

The present invention may be used in the context of these exemplary or other fund movement systems.

In the description to follow, the term "client account" refers to an account associated with client funds, such as, for example, consisting of funds of the client designated or determined for management by the deposit management system, to be described. The present invention may be used in the context of these or other fund movement systems.

Referring to FIG. 1A, the present invention generally relates to a system, method and program product for administering a deposit sweep program and/or fund exchange program wherein funds are received/swept from or deposited back to one or more source institutions 100, 110, e.g., financial institutions, such as banks, broker-dealers, financial advisors, and other financial institutions, under instruction of a deposit management system 160 ("DMS" or interchangeably "system"), to or from government-insured interest-bearing aggregated deposit accounts in one or more recipient institutions, e.g., banks 130-150 participating in the deposit sweep interchange program. Note that in embodiments, a respective source institution may hold one or more of these aggregated accounts and may also function as a recipient institution.

The deposit management system 160, comprises one or more computers, configured to receive notification of sweep transfer amounts or other fund transfer amounts to or from one or more source institutions 100, 110, and/or to receive a fund reallocation for deposit/transfer amount(s) and withdrawal/transfer amount(s) generated by or for the deposit management system 160, and to allocate these deposit/transfer amounts and withdrawal/transfer amounts to the recipient institutions, e.g., the banks 130-150, based on one or more parameters. The deposit management system 160 maintains, or in some embodiments merely accesses, data for a time dimension for selected deposits designated by the respective contributing source institution or designated by another entity, or data for a time dimension for all deposits of a selected source institution, or data for a time dimension for all deposits from all source institutions. With this time dimension data, the system 160 may vary an interest allocation for a respective deposit from a respective source institution, based at least in part on the time dimension, and in some embodiments, based on additional dimensions, such as an amount dimension and/or relationship dimension, to name a few.

As noted, each of a plurality of these recipient institutions banks 130-150 in the deposit sweep management system 160 holds one or more interest-bearing aggregated deposit accounts 134 (for example, an aggregated money market deposit account, e.g., MMDA) for holding funds in the program). In embodiments, these aggregated deposit accounts are insured, for example with government-backed insurance, such as FDIC insurance or NCUSIF insurance. These one or more recipient institution 130-150 may also hold other investment vehicles managed in the program for use in holding deposits/transfers.

In the example drawing shown in FIG. 1A, a source institution 100 maintains a plurality of client accounts (107A, 107B, 107N), with each of a plurality of the respective client accounts held on behalf of different clients. In embodiments, the respective source institution has a relationship with a control operating account 105 in a bank. Funds flow in and out of the client accounts (107A, 107B, 107N), either via the control operating account 105, which may be held in the respective source institution 100, or may be held in an associated financial institution. Alternatively, if the source institution is a broker-dealer, then the control operating account 125 may be held by a bank 120 that is associated with that broker-dealer, such as an affiliated bank of the broker-dealer, or in a bank 120 not affiliated with the broker-dealer. In other embodiments, the funds in one or more of the client accounts may flow directly between institutions without an external control operating account.

Fund movement data may be received by the deposit management system 160, either via a sweep file comprising fund transfers swept from or to one or more of client accounts, of a source institution, 100, or via fund transfer data from another entity (e.g., a payment or credit vendor such as a debit card or credit card processor), or a fund reallocation determined for the deposit management system 160. The fund movement data may be received electronically by wire, or via Facsimile or telephone, for example, so that the data may need to be manually keyed into the computer(s) of the DMS 160. The deposit and withdrawal fund transfers may comprise, for the source institutions, in embodiments, data for individual check deposit data, wire deposit data, electronic ACH deposit data, electronic debit card transaction files, electronic credit card transaction files, check presentment data, ACH debit data, touch tone bill paying data, Internet bill paying data, a sweep file, or a net of a plurality of deposit/transfers for one client account or multiple client accounts, or a net of one or more of withdrawals/transfers for one client account or multiple client accounts, or a net of one or more deposits/transfers and one or more debits/transfers from one client account or multiple client accounts.

FIG. 1B illustrates a second way of viewing the overall system in a hub and spoke context, for ease of explanation. At the center or hub is the deposit management system 160, and a control operating account 125. The source institutions 100 and 110 are illustrated as spokes, with each source institution comprising client accounts 107, as reflected in FIG. 1A. The source institution may optionally also include a control operating account associated therewith in some embodiments. The recipient institution 130, with an optional transaction account 132, and MMDA 134, is shown as another spoke in the figure. Institutions 170 and 180 are illustrated as yet other spokes in the figure. Institutions 170 and 180 operate as both source institutions in some fund transfers, and recipient institutions in other fund transfers. Institution 170 comprises multiple client accounts 172, as well as an optional transaction account 174 and an MMDA 176. Likewise, institution 180 comprises multiple client accounts 182, as well as an optional transaction account 184 and an MMDA 186.

Figure 2:
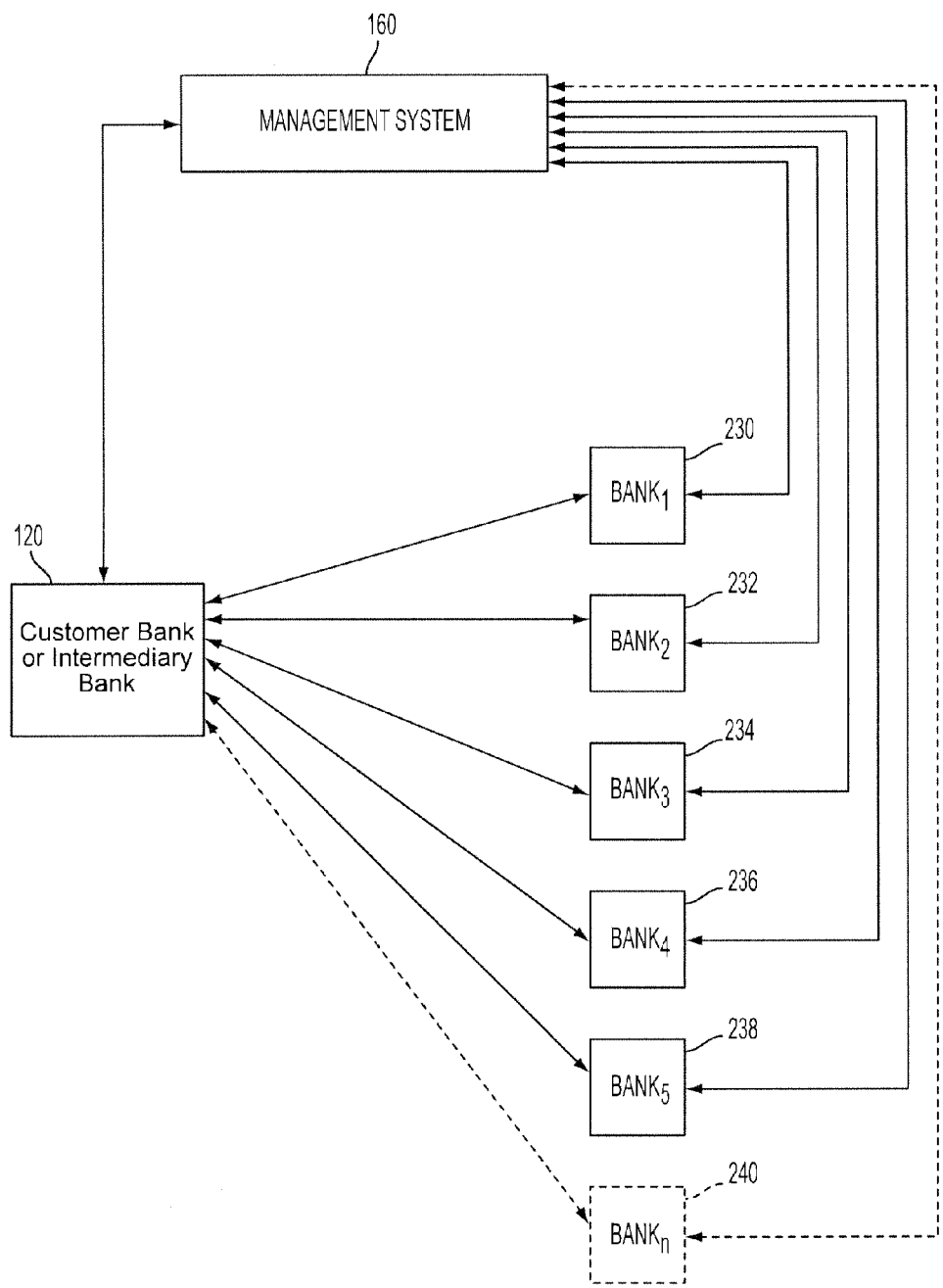
FIG. 2 is a schematic block diagram of an exemplary system in accordance with embodiments of the invention.

FIG. 2 is a further drawing that illustrates a plurality of the program banks 230, 232, 234, 236, 238 and 240, in relation to the management system 160 and the intermediary bank 120.

A variety of embodiments are disclosed to implement the concept of flexible interest rates based at least on a time dimension.

In embodiments of a sweep program or exchange to provide flexible interest rates based on a time dimension, the system 160 may provide a straight enhanced interest rate for an entire period, e.g., 2 years, to a source institution that is the source of the funds into the system. But if the source institution does not keep their deposits in the system for the entire period, then the source institution may be required either to pay a fee or forfeit some of the interest for the period in such embodiments, or simply receive a market rate for the period that the funds were maintained in the system.

Note that in some cases, the recipient institution may request funds from the system and may be willing to pay a higher than market interest rate. If the recipient institution does not hold deposits received from the system for the entire period, then the recipient institution may be required either to pay a fee or forfeit some interest.

In embodiments of a sweep program or exchange to provide flexible interest rates based on a time dimension, the system may allocate funds for a low or market interest rate, e.g., 1%, for funds held in recipient institutions for the program in the system that originated from the source institution. If the source institution maintains the money in the system for an entire pre-determined time period, e.g., 2 years, then the system may allocate additional interest to pay the source institution a lump sum at the end of the pre-determined time period, or periodic smaller lumps sums over the course of the period, to obtain a blended rate over the entire period, e.g., 2 years.

In embodiments of a sweep program or exchange to provide flexible interest rates based on a time dimension, the system would allocate to the source institution a market interest rate, e.g., 1%, for year 1, but may allocate a higher interest rate for year 2, e.g., 3%. Funds to pay the rate difference of 2% may be obtained from one or more program recipient institutions R that are willing to pay an extra 2% for a period extending beyond the one year mark, or may be willing to pay the higher rate if the money is maintained with recipient institution R for the entire 2 year period. Allocation of funds to pay different interest rates for different time periods may result in a blended rate of approximately 2% for the entire time period, e.g., a 2 year period. Note that, in embodiments, only the market rate, e.g., 1%, may be allocated for interest to the source institution if money is not maintained by the source institution in the system for the entire 2 year period. Note also that the system 160 may need to find another program institution R to pay the higher interest rate. In embodiments, the program institution R may be incented by charging the recipient institution R an interest rate of 3% in year one for the deposit of funds from the source institution, but then reducing the interest rate charge to the recipient institution R to 1% for the second year and each year thereafter.

In embodiments, different interest rates may be charged to source and recipient institutions at different time periods, and one or more intermediary banks may be used to hold the interest for allocation. The system 160 may then make interest allocations of funds held in these one or more intermediary banks to pay a blended interest rate to the source institution if one or more time periods for holding the funds in the system are met. For example, if the recipient institution R has agreed to pay 3% for the source funds for the first year, and 1% for the second year, then every month or other period at least the excess interest over the 1% market interest rate may be provided to a shortfall account held at an intermediary bank. In this example, the source institution may accrue interest daily, and every month or other period, the system may allocate 1% interest to one or more accounts of the source institution for posting as interest. At the end of one year, the source institution funds begin to accrue interest daily for every day after this one year date at a rate of 3%. At the end of the first month in the second year (e.g., 1 year and 1 month), the system allocates an amount for the accrued 3% interest for this first month in the second year. This 3% allocation may comprise allocating at least a part of the funds from the short fund account at the intermediary bank for the interest for the source institution. At the end of the full time period, e.g., 2 years, the source institution has received a blended interest rate for the funds of the source institution. Note that this is an example, and the example accrual period and the example allocation timing is not limiting on the invention.

Note that where the source institution withdraws funds early before the end of the two year period, then the system 160 in embodiments may find another source institution and may provide a higher then market interest rate for these substitute funds, or may allocate the market interest rate for these substitute funds, and keep the interest differential in the system. In embodiments, the higher interest differential may be allocated back to the recipient institution.

Alternatively, if the recipient institution sends its received funds back to the system before the end of the 2 year period, then the system in embodiments may need to find another recipient institution to place the source deposits, in order to provide extra interest to allocate back to the source institution that has maintained its funds in the system for the entire 2 year period. Alternatively, the system may only provide the market interest rate to the source institution in this situation.

In a yet further embodiment of a sweep program or exchange to provide flexible interest rates based on a time dimension, the system may allocate funds to the source institution to realize a gradually increasing interest rate over a predetermined time period, e.g., 1% for the first quarter, 1.25% for the second quarter, 1.50% for the third quarter, up to 2.75% in the last quarter of a two year period. Note that the rate may be programmed to increase every day, or every week, or every month, or over any other convenient period. The source funds thus may receive a blended rate over the period of time, with increases based on time.

Note that in a further aspect, flexible interest rate embodiments may be implemented using a two dimensional tiering table, wherein a first dimension is the amount sourced into the system from the source institution, e.g., $20 million or more, $50 million or more, $100 million or more, $200 million or more. The second dimension may then be time, e.g., held for 1 month, held for 6 months, held for 1 year, held for 2 years, etc., with the rate in the table increasing as larger amount thresholds are met and held for longer periods of time. Note that additional dimensions may be added to the table to vary the interest rate, e.g., relationship dimensions, credit-worthiness dimensions, etc.

Note that in the system operation, it is possible for a program institution to be only a source institution, or only a recipient institution, or both a source institution and a recipient institution. Also, in some embodiments, there may not be a requirement for reciprocity, e.g., a recipient institution may not be required to source funds into the system in order to receive funds as a recipient institution, or vice versa. Alternatively, there may be various levels of reciprocity required by the system, up to 100% or more, based on one or more criteria, such as a relationship criterion or an interest rate criterion, or a credit-worthiness criterion, to name a few.

Figure 4:
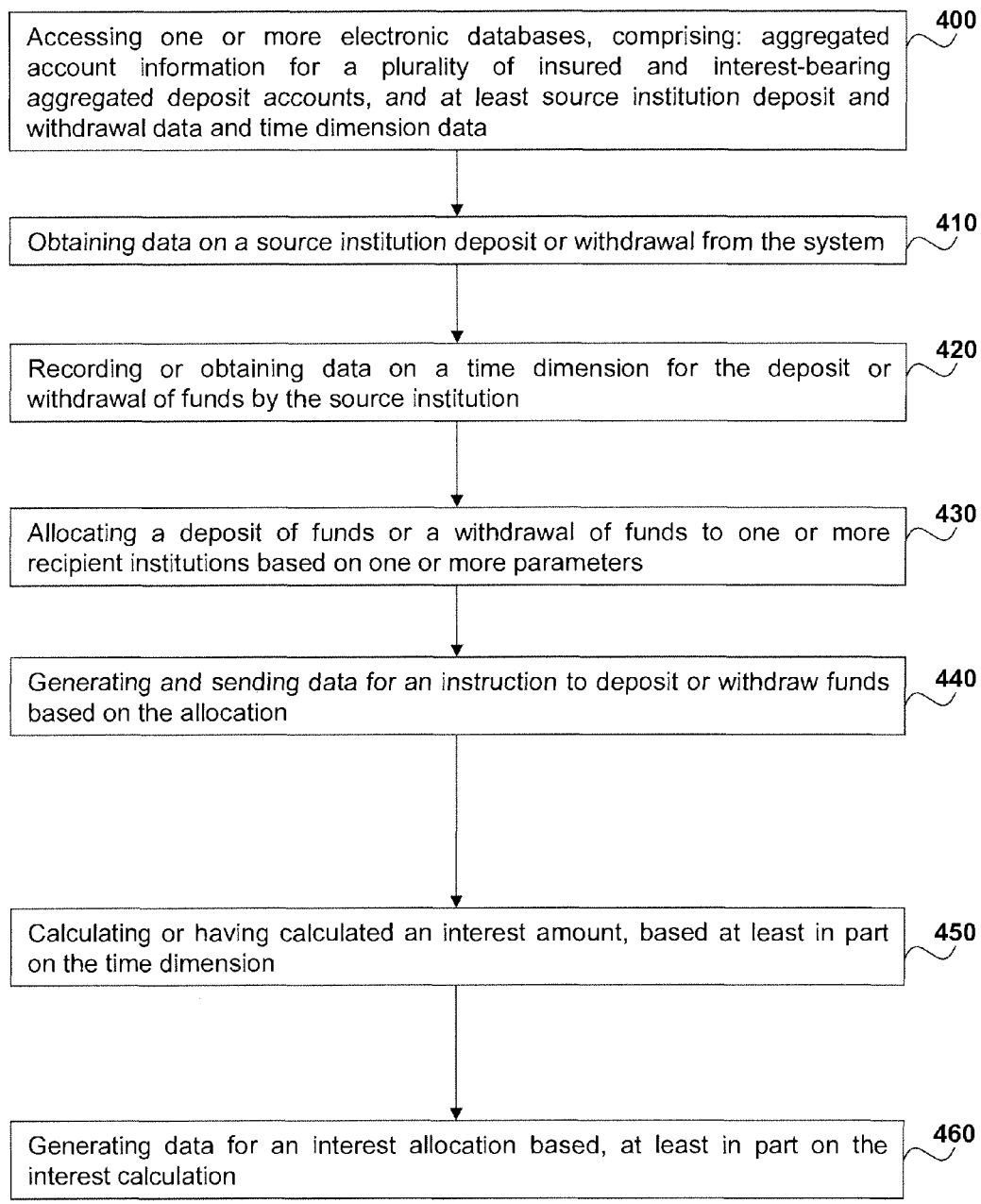
FIG. 4 is a schematic flow chart of an exemplary method in accordance with embodiments of the invention.

Referring to FIG. 4, an embodiment for implementing one aspect of the invention is shown. A computer system for this embodiment comprises one or more computers comprising memory wherein the memory stores computer-readable instructions that, when executed, cause the one or more computers to perform one or more of the following steps.

Block 400 comprises a computer-implemented operation performed for one or more of the steps of the process, of accessing using the one or more computers, one or more electronic databases, stored on one or more computer-readable media, comprising: aggregated account information for a plurality of government backed-insured and interest-bearing aggregated deposit accounts held in a plurality of program institutions. Each of these aggregated accounts hold funds of multiple client accounts. In embodiments, the one or more databases further comprise (ii) source institution deposit information including (1) time data on when a deposit was received into the system for deposit into interest-bearing aggregated deposit accounts held in one or more of the program institutions and/or how long the deposit has been held in the system, and (2) an amount of the deposit. In embodiments, the one or more databases may further comprise (iii) client account information for multiple client accounts comprising: (1) a respective client balance of funds held in the one or more government backed-insured and interest-bearing aggregated deposit accounts held in the program institutions; and/or (2) a respective balance of funds from the respective client account held in each of the one or more insured and interest-bearing aggregated deposit accounts holding funds of the respective client account.

Block 410 comprises a computer-implemented operation of obtaining transfer data, using the one or more computers, describing a deposit of funds to or a withdrawal of funds from the system by a source institution. Note that the method of obtaining the data is not limiting on the invention, and may comprise receiving the data via a network transmission, or via facsimile, or by telephone, and then keyed into the system, to name a few.

Block 420 comprises a computer-implemented operation for a deposit into the system, of recording or having recorded or accessing or otherwise obtaining time dimension data, e.g., the date and/or time of the deposit and the amount of the deposit from the source institution associated with the deposit or withdrawal, and/or obtaining it from the one or more electronic databases, using the one or more computers, and obtaining a time dimension interest rate and/or a lump sum that applies for the period. If the transaction is a withdrawal/transfer, then the system may record time dimension data for the withdrawal, e.g., the date and/or time of the withdrawal and the amount. The time dimension interest rate and/or lump sum may be obtained from a database, or may be determined from a tier table with at least one dimension being time, or obtained from a third party based at least in part on a time dimension. In embodiments, the time dimension interest rate varies depending on how long the deposit has been held in one or more other of the recipient institutions participating in the program. In embodiments, the time dimension interest rate may increase progressively from time period to time period.

Block 430 comprises a computer-implemented operation of allocating the deposit funds from the source institution to one or more other of the recipient institutions (not including the source institution) participating in the program for deposit in one or more aggregated deposit accounts held therein, or to allocate a withdrawal of funds from one or more recipient institutions to satisfy a withdrawal on behalf of the source institution. In embodiments, the deposits and withdrawals for a plurality of source institutions allocated to a given recipient institution may be netted, and a net amount deposited or withdrawn from the respective recipient institution.

In embodiments, one or more of the recipient institutions may be selected or determined for a deposit or a withdrawal from a database based, at least in part, on an interest rate that they are paying or willing to pay for system funds, or based on a credit-worthiness of the respective recipient institution. For example, a respective recipient institution for a fund deposit may be determined based, at least in part, on data in one of the one or more databases indicating that the recipient institution is willing to pay interest at a rate of 3% for a first year, and 1% for a second year. Likewise, a respective recipient institution for a withdrawal of funds may be determined based at least in part on data in one of the one or more databases indicating that the recipient institution is only paying a market rate of 1% interest on funds that it is holding.

Block 440 comprises a computer-implemented operation of generating data for instructions, to deposit/transfer funds or to withdraw/transfer funds from, one or more aggregated deposit accounts in one or more of the recipient institutions, based at least in part on the deposit/transfer data and/or the withdrawal/transfer data and based at least in part on the allocating step.

Block 450 comprises a computer-implemented operation of calculating, using the one or more computers, or having calculated using one or more computers, for funds of each of one or more source institutions, a respective interest amount for funds of the respective source institutions held in the one or more aggregated deposit accounts of one or more of the recipient institutions, for a period of time, e.g., a week, a month, a quarter, 6 months, a year, 2 years, to name a few, based, at least in part, on the time dimension data relating to how long the source funds have been held in one or more other of the recipient institutions participating in the program and the time dimension interest rate for the period of time. Note that the having calculated operation may comprise contracting with a third party to perform the calculation on behalf of the system. For example, interest for a first quarter in time, or a first year in time, may be calculated at a market interest rate, and a subsequent quarter in time, or a subsequent year in time, may be calculated at a different rate, with the rate determined, based at least in part on the time dimension. In embodiments, the rate of interest for the calculation may be based at least in part on two-dimensional tiering, comprising a time dimension relating to how long the source funds have been held in the system, and possibly one or more other dimensions, such as an amount dimension and/or a relationship dimension and/or a credit-worthiness dimension. As noted, the time dimension interest rate for the calculation may be obtained by accessing a database, or by calculating a length of time that the funds have been held and performing a logic determination based on this calculation, to name a few of the methods available for obtaining the interest rate. The method of obtaining the interest rate is not limiting on the invention.

Block 460 comprise a computer-implemented operation of generating data for allocating interest to source funds of a source institution based, at least in part, on the calculated interest amount for the respective source funds.

Note that in embodiments, for each source institution there may be a separate interest-bearing aggregated deposit account in each of more than one of the program recipient institutions. In other embodiments, one or more of the interest-bearing aggregated deposit accounts holds funds from multiple source institutions, so that source institutions having funds in the same aggregated deposit account and are accorded different interest rates based, at least in part, on a time dimension for their respective funds held therein. Note that the having calculated operation may comprise contracting with a third party to perform the calculation on behalf of the system and then receiving the amount or accessing a database to obtain the amount.

In embodiments, a computer-implemented operation is performed of updating or having updated electronically, using the one or more computers, a respective interest amount posted for funds of the source institution, and/or to client accounts represented by the source funds, in the one or more databases.

Individual Client Account Flexible Interest:

Note that the foregoing embodiments may also be implemented with individual accounts. For example, in embodiments, an at least two-dimensional tiering process for setting interest rates comprises assigning an interest tier to a client account based on at least on two dimensions: a client balance parameter, comprising a balance from the client account held in one or more of the aggregated deposit accounts in the program institutions, and a time dimension, comprising a time the client balance in the aggregated deposit accounts is held within a prescribed range. In embodiments, an interest rate may initially be assigned to the respective client account, by default, or by using another method disclosed in this application, for example. However, if it is subsequently determined that the client balance in the one or more aggregated deposit accounts has been maintained within a given range for an entire prescribed time period, e.g., 2 years, then the interest rate may be set to a different higher interest rate, and computed and posted in place of any interest already posted for a sub-period of the prescribed time period. Alternatively, additional interest may be added, to bring the interest for the entire prescribed time period up to an amount that realizes a blended interest rate. Alternatively, after some minimum time period has elapsed, e.g., 1 day, 1 week, 1 month, 1 quarter, 6 months, 1 year, 2 years, to name a few, the interest rate may be progressively increased in time, as previously described. Any of the other previously described methods for assigning an interest rate or computing interest lump sums may be used herein. Note that holding the balance within the range in embodiments means that balance may not ever drop below a lower limit of the range during the prescribed period of time. In embodiments, a monitoring program may be used that monitors a lowest balance for the client account held in the aggregated deposit accounts in the program, to thereby make the determination that the client balance in the aggregated deposit accounts has remained at or above a given lower range limit. If the balance has been held within the range for the prescribed period of time, then a flag may be set, or other data may be placed in a database to indicate the highest range for which the respective client balance has been maintained at or above the lower limit for that range for the period. This two-dimensional tiering is illustrated in embodiments, by Tables A-C, below.

TABLE A

| BALANCE IN THE FOLLOWING RANGES HELD FOR 1 YEAR: | |
| --- | --- |
| Tier I - Balance $5,000 up to less than $10,000 | Rate = 1% |
| Tier II - Balance $10,000 up to less than $25,000 | Rate = 1.5% |
| Tier III - Balance $25,000 up to less than $50,000 | Rate = 2% |
| Tier IV - Balance $50,000 or above | Rate = 2.5% |

TABLE B

BALANCE IN THE FOLLOWING RANGES HELD FOR 2 YEAR:

| | |
|---|---|
| Tier I - Balance $5,000 up to less than $10,000 | Rate = 2% |
| Tier II - Balance $10,000 up to less than $25,000 | Rate = 2.5% |
| Tier III - Balance $25,000 up to less than $50,000 | Rate = 3% |
| Tier IV - Balance $50,000 or above | Rate = 4% |

TABLE C

BALANCE IN THE FOLLOWING RANGES HELD FOR 5 YEAR:

| | |
|---|---|
| Tier I - Balance $5,000 up to less than $10,000 | Rate = 3% |
| Tier II - Balance $10,000 up to less than $25,000 | Rate = 3.5% |
| Tier III - Balance $25,000 up to less than $50,000 | Rate = 4% |
| Tier IV - Balance $50,000 or above | Rate = 4.5% |

Accordingly, in embodiments, after the system has determined that the client balance in one or more of the aggregated deposit accounts has been maintained within a range set forth in the tier table for the prescribed time period, e.g., 1 year, then a higher interest rate of 4% may be assigned for computing interest for this entire period of time. The actual computation of the interest may, in embodiments, use a measure of the client balance (e.g., an average, or a mean, over the time period, or over multiple sub-periods) in the one or more of the aggregated deposit accounts, multiplied by the selected higher interest rate. The resulting interest amount may be posted to the client account for the prescribed time period, replacing any amount that has already been posted for one or more sub-periods of time, e.g., a month, within the prescribed period of time. Alternatively, various other calculations may be used to provide a blended interest rate for the client funds for the entire prescribed period of time. Any of the previously described methods of calculating interest may be used with the individual client account embodiments.

Note that in embodiments, the two-dimensional tiering may be implemented with a plurality of tiering tables, with each tiering table for a different prescribed time period, e.g., 1 year, 2 years, 3 years, to name a few. In further embodiments, a third set of tiering tables may be provided for implementing an additional tiering parameter. For example, a parameter relating to relationship may be used as an additional tiering dimension with different interest rates. Additional tiering dimensions may be added, as desired.

Note that embodiments may be implemented for computing interest for a variety of different client accounts, but may be especially advantageous for use with demand accounts and other accounts, where the client wishes to maintain freedom to withdraw funds at will for emergencies, but has no immediate need or plan to do so. If the client is able to maintain his/her balance within one of the ranges for one of the prescribed periods of time, he/she is rewarded. The determination may be made during or after the end of the prescribed period of time. Note that multiple interest recalculations may occur, as additional prescribed time period requirements are met, e.g., a recalculation after 1 year, a recalculation after the client balance has been maintained for 2 years, a recalculation after the client balance has been maintained for 3 years, to name a few. As noted, any of the previously described methods of calculating interest may be used with the individual client account embodiments.

Figure 5:
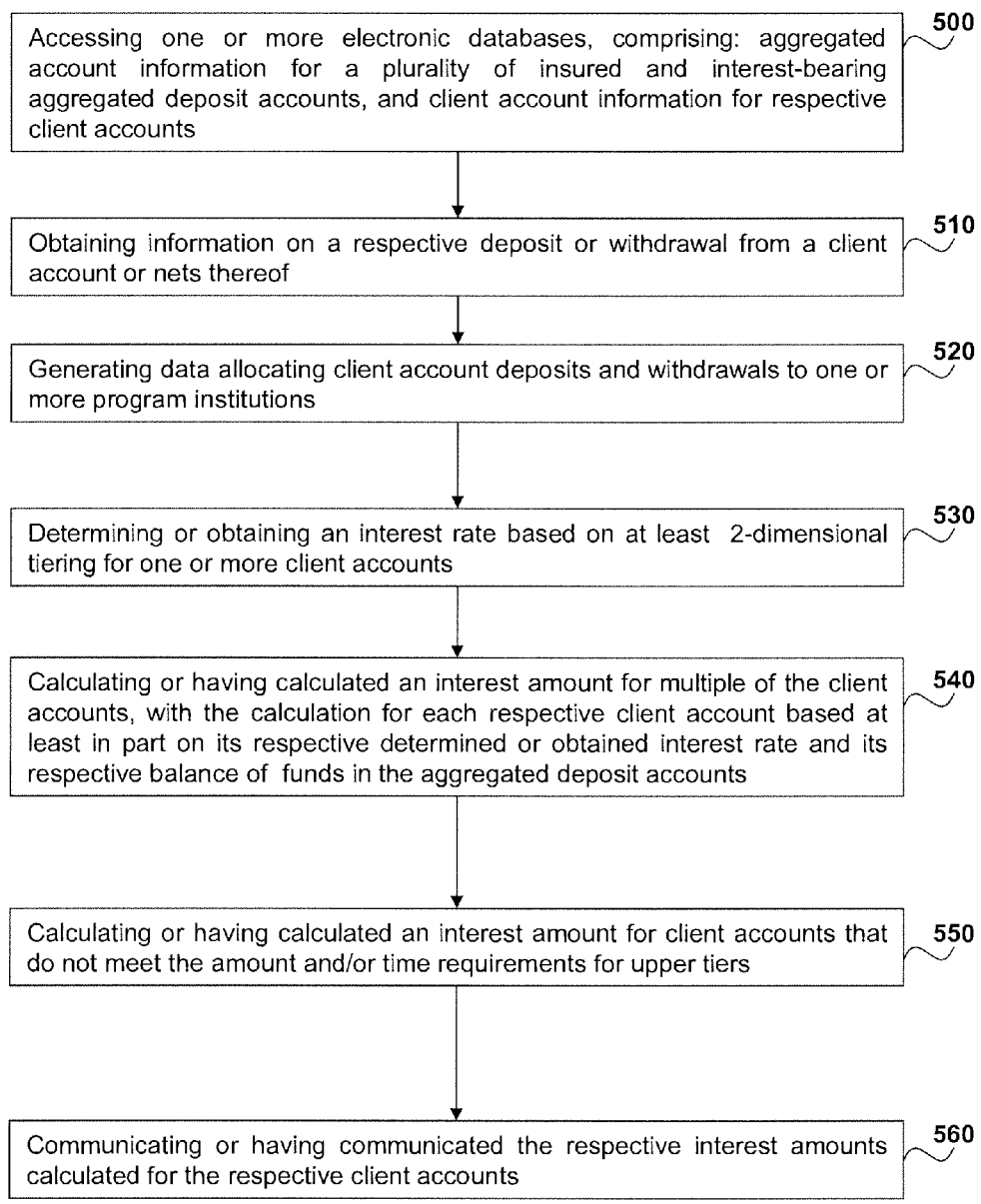
FIG. 5 is a schematic flow chart of an exemplary method in accordance with embodiments of the invention.

Referring to FIG. 5, a computer implementation of this client account embodiment is shown. A computer system for this embodiment comprises one or more computers comprising memory wherein the memory stores computer-readable instructions that, when executed, cause the one or more computers to perform the following steps.

Block 500 comprises the computer-implemented operation performed for one or more of the steps of the process, of accessing by the one or more computer, one or more electronic databases, stored on one or more computer-readable media, comprising: (i) aggregated account information for one or more government backed-insured and interest-bearing aggregated deposit accounts held in one or more institutions in a program, wherein funds from client accounts of a plurality of clients are held with funds of other client accounts in the one or more aggregated deposit accounts held in the one or more institutions in the program; and (ii) client account information for each of the respective client accounts comprising: (1) a respective client balance of funds held in the one or more interest-bearing aggregated deposit accounts held in the one or more institutions in the program; (2) data for the respective client account relating to a time parameter, e.g., a time period in which a threshold balance has been maintained in the one or more program institutions in the system; and (3) a respective balance of funds from the respective client account held in each of the one or more government backed-insured and interest-bearing aggregated deposit accounts holding funds of the respective client account.

Block 510 comprises the computer-implemented operation of obtaining, using the one or more computers, data directly or indirectly from one or more clients or on their behalf describing a deposit to or a withdrawal from one or more client accounts. This information may be received through a variety of different communication channels, and may comprise withdrawals by check, debit card transaction, credit card transaction, ACH transaction, nets thereof, and communications from third party service companies with respect to such withdrawals, to name a few, as well as deposit data from various entities. The data may be obtained by accessing a database or a website, or it may be received via a transmission, or by facsimile or by telephone and then keyed into the system, to name a few. The method of obtaining the deposit and/or withdrawal data is not limiting on the invention.

Block 520 comprises an optional computer-implemented operation of generating allocation data for instructions, to deposit funds to at least one of the one or more aggregated deposit accounts based on the client deposit and/or withdrawal data, or to withdraw funds from at least one of the one or more aggregated deposit accounts based on the client deposit and/or withdrawal data. In embodiments, the amount allocated for deposit and/or withdrawal may comprise nets of data for one client account or for multiple client accounts.

Block 530 comprise the computer-implemented operation of determining or obtaining from the database and/or from another source, using the one or more computers, for each of the plurality of the respective client accounts a respective interest rate based on at least a two-dimensional tiering, so that some different clients' accounts having funds in the one or more aggregated deposit accounts, are accorded different interest rates, wherein the two-dimensional tiering comprises assigning a particular interest rate or allocating a lump sum for a respective prescribed period of time, e.g., 1 day, 1 week, 1 month, 1 quarter, 6 months, 1 year, 2 years, to name a few, to the respective client account if the respective client balance of funds in the one or more aggregated deposit accounts holding funds of the respective client account is within a balance range for this entire prescribed period of time. Any of the methods previously described may be used to determine the interest rate. In embodiments, the interest rate may increase progressively from time period to time period. This determining operation may be performed by accessing a database, or by making a logic computation, to name a few.

Block 540 comprises the computer-implemented operation of calculating, using the one or more computers, or having calculated by one or more computers, for each of one or more of the client accounts, a respective interest amount for funds of the respective client account held in the one or more aggregated deposit accounts, for the prescribed time period based at least in part on the respective interest rate for the respective client account and the balance of funds of the respective client account held in the system in one or more aggregated deposit accounts therein. Note that the having calculated operation may comprise contracting with a third party to perform the calculation on behalf of the system.

Block 550 comprises a computer-implemented operation of calculating, using the one or more computers, or having calculated by one or more computers, for each of a different one or more of the client accounts determined to have another interest rate not based on the two-dimensional tiering, a respective interest amount based at least in part on the respective other interest rate for the respective client account and the balance of funds of this respective client account held in the system in one or more aggregated deposit accounts therein. Note that the having calculated operation may comprise contracting with a third party to perform the calculation on behalf of the system. This step may be performed when the funds for a respective client account drop below the threshold amount during the respective time period. In embodiments, a market interest rate may be used for the calculation. Note alternatively, that the interest rate used for this calculation may be represented in a two-dimensional tier table as a bottom tier.

Block 560 comprises the computer-implemented operation of communicating or having communicated the data on calculated interest amounts for the respective client accounts with funds held in the one or more aggregated deposit accounts in the program. Note that this communication operation may be performed by posting the information to a website, or updating a database, or transmitting the information, to name a few. This interest amount or a different interest amount may then be posted to the client accounts.

Term Deposit Swapping:

In embodiments, an exchange may be implemented using aggregated deposit accounts for swapping term deposit (e.g., CD's) funds among program institutions. In some cases, a concern may arise that in swapping a term deposit, the system may be required to match both the term deposit amount(s) and the terms of the swapped time deposit amount(s)—which may lead to significant complexity and may result in frequently not being able to find a match for a particular time deposit swap.

In embodiments, the system 160 may match only amounts and not time deposit terms. In embodiments, the source institution providing the time deposit funds into the system for deposit into one or more aggregated deposit accounts in other recipient program institutions may agree to accept a same amount of funds it has sourced into the system (or more) and may agree to pay a term rate on at least the amount that it has sourced into the system.

For example, an institution that wishes to swap out term deposit funds to obtain government-backed insurance for a term deposit amount that exceeds an insurance limit, may agree to accept at least a matching amount of money on which it may agree to pay a term rate of interest. The system 160 operates by swapping out the term money from this source institution to one or more aggregated deposit accounts in one or more other recipient program institutions in a program, which recipient program institutions pay interest at different interest rates, e.g., a market (demand) interest rate on this received money. The system 160 may maintain or access a ledger of term funds sourced into the system, to monitor interest rates and to monitor whether the term deposit source institution has maintained the funds in the system for the entire prescribed term. Any shortfall in interest that the term money earns in the recipient program institutions may be covered by the term rate interest amount paid by the source institution on a matched amount of reciprocal funds it may have received in the swap.

In essence, in embodiments the program institution source of the term money may be accepting at least a reciprocal matching amount of funds on which it agrees to pay a term rate. Thus, the source program institution is paying/covering the term interest rate for the term money it has sourced into the system, regardless of the interest paid by the other program institutions receiving tranches of the term deposit coming from the source program institution. But the result is that these tranches of term deposit funds are government backed-insured via the aggregated deposit accounts, which accounts may or may not be non-term deposit accounts, e.g., MMDA's and/or term deposit accounts.

Figure 6:
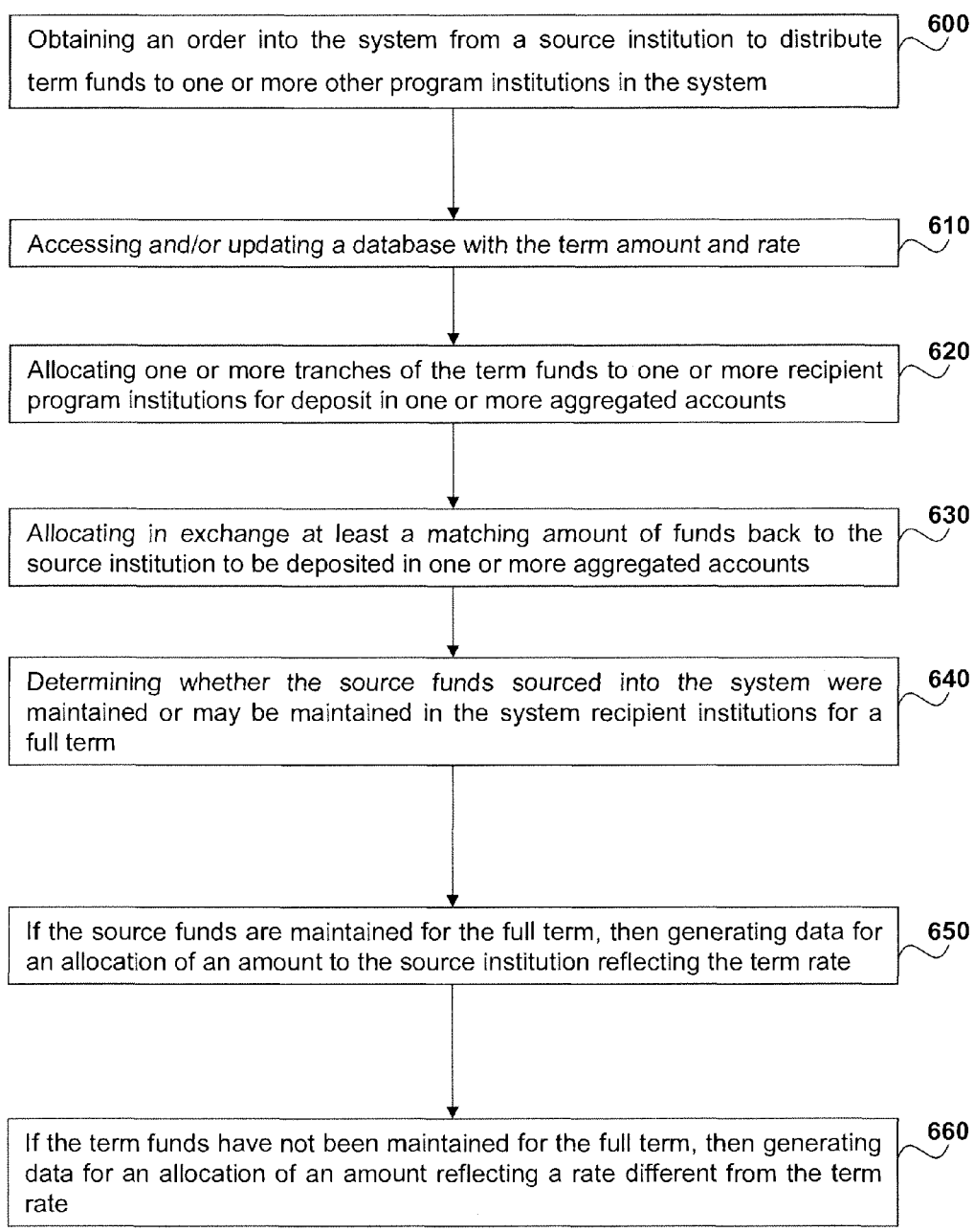
FIG. 6 is a schematic flow chart of an exemplary method in accordance with embodiments of the invention.

Embodiments of a method for implementing time deposit fund swapping comprise the steps illustrated in FIG. 6. Note that a number of these step include an access to one or more databases stored on one or more computer-readable media, comprising: aggregated account information for a plurality of government backed-insured and interest-bearing aggregated deposit accounts held in a plurality of program institutions. These aggregated accounts hold fund of multiple client accounts. In embodiments, the one or more databases further comprise (ii) source institution deposit information comprising (1) time data on when a deposit was received into the system for deposit into interest-bearing aggregated deposit accounts held in one or more of the program institutions and/or how long the deposit has been held in the system, (2) a rate for the deposit, and (3) an amount of the deposit. In embodiments, the one or more databases may further comprise (iii) client account information for multiple client accounts comprising: (1) a respective client balance of funds held in the one or more government backed-insured and interest-bearing aggregated deposit accounts held in the program institutions; and/or (2) a respective balance of funds from the respective client account held in each of the one or more insured and interest-bearing aggregated deposit accounts holding funds of the respective client account. The steps in the embodiment of FIG. 6 comprise the following.

Referring more particularly to FIG. 6, block 600 in FIG. 6, represents an operation of obtaining an order into the system from a source program institution to distribute term deposit funds with a term deposit interest rate and a term period to one or more other recipient institutions participating in the program. Note that this obtaining operation may be performed by accessing one or more databases, by accessing a website, or by receiving a transmission of order data, or receiving the order data by fax or telephone and keying the data into the system, to name a few. The manner of obtaining the order data is not limiting on the invention.

Block 610 comprises accessing, or in some embodiments, updating, using the one or more computers, a database/ledger to list the term funds amount from the source program institution and the term for this term deposit.

Block 620 comprises allocating, using the one or more computers, one or more tranches of the term deposit funds from the source program institution to one or more recipient institutions to one or more aggregated deposit accounts held therein. Note that the recipient institution may agree to pay a different interest rate from the term rate, e.g., a market rate for these received funds. The rate that the recipient institution agrees to pay is not limiting on the invention. Examples of various parameters that the system 160 may use to select or determine a recipient institution have been described previously. Note that in embodiments there may be no requirement for reciprocity. The recipient institution may not have sourced any funds into the system. Likewise, there may be no requirement to select recipient institutions based on a rate of interest the recipient institution is willing to offer/pay for the funds, or a length of time the recipient is willing to hold the sourced funds. However, embodiments may comprises some level of reciprocity of deposits and/or a requirement to pay a certain interest rate and/or agree to hold the funds for some minimum period of time.

Block 630 represents an operation of allocating, using the one or more computers, at least a matching amount of funds (it may be more in embodiments) back to the source institution that has agreed to pay at least the term rate on these allocated funds, e.g., substantially the same rate as the term amount of funds sourced into the system from this source program institution at least on the amount of term funds that it has sourced into the system.

Block 640 represents an operation of determining, using the one or more computers, by accessing one or more databases or by a calculation, or in some other manner, whether the term deposit funds sourced to other of the one or more of the aggregated deposit accounts were maintained or may be maintained in the other of the recipient institutions participating in the program for the full term period. The method of determining is not limiting on the invention.

Block 650 represents an operation, using the one or more computers, of generating and communicating data for an allocating of an amount of interest to the source institution that is based at least part on the term deposit interest rate for the term deposit funds, if the term funds have been maintained in maintained in other of the recipient institutions participating in the program for the full term. Note the interest allocated may comprise, in embodiments, the interest earned at the source institution based at least in part on the interest earned on funds received back from the system in step 630, paid at the term deposit rate.

Block 660 represents an operation, using the one or more computers, of generating and communicating data for allocating an amount representing a lower interest rate, or allocating no interest, or allocating interest calculated at other than the term interest rate, e.g., the market rate, to the source institution, if the term funds have not been maintained in other of the recipient institutions participating in the program for the full term period. In embodiments, a penalty may be applied to reduce the interest allocation to the source institution. In embodiments, there may be no penalty for early withdrawal of the term deposit funds other that the reduction of the interest rate to the market rate, so that the term deposit funds may be considered liquid.

The one or more databases may be updated, using the one or more computers, to reflect the added interest.

Note that in embodiments described using a time dimension, a factor used in selecting a recipient financial institution to receive sourced funds, and a factor in allocating interest to source institutions may be a credit-worthiness of the respective financial institution.

Additionally, even without a time dimension being taken into a account, a source institution with a high level of credit-worthiness may be allocated interest at a higher rate than other source institutions based, at least in part, on the higher credit-worthiness of the respective source institution. Likewise, a recipient institution may be allocated funds and required to pay a lower rate of interest based, at least in part, on a higher credit-worthiness of this respective recipient institution relative to other recipient institutions. Additionally, credit-worthiness may be added as a dimension in a tier table of interest rates offered to source institutions providing funds into the system.

Figure 3:
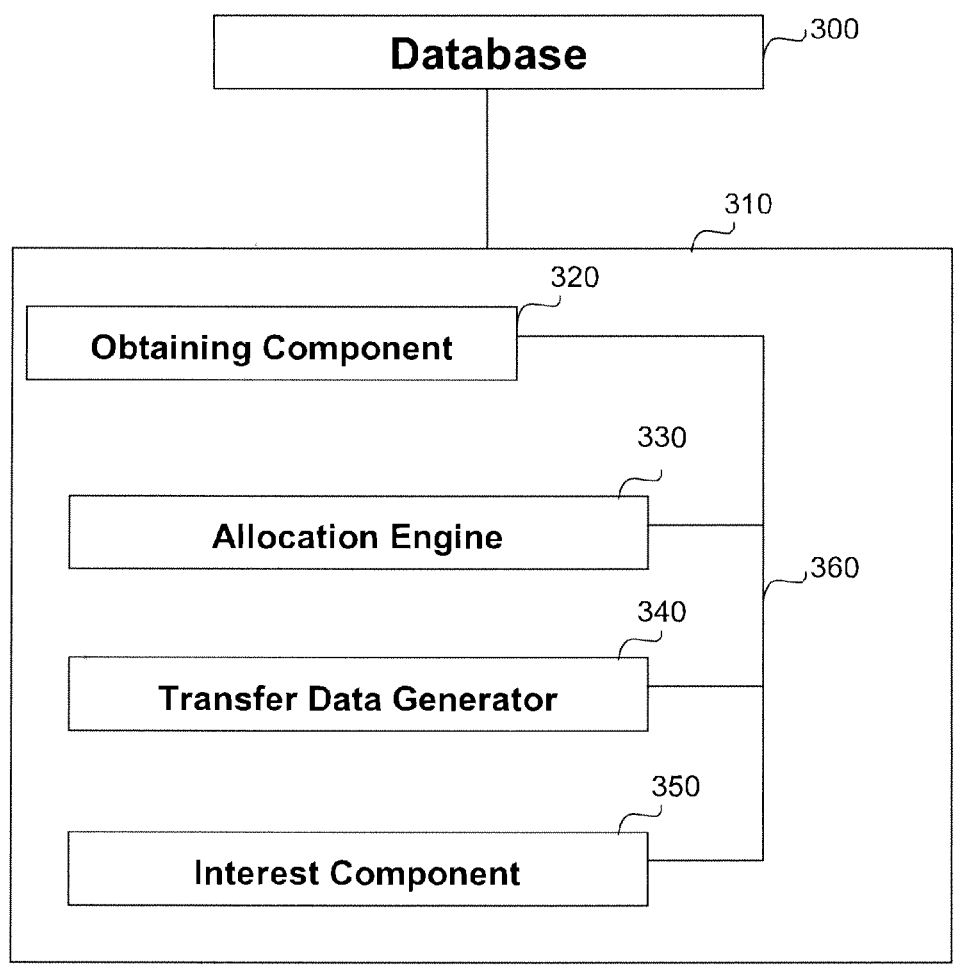
FIG. 3 is a schematic block diagram of an exemplary management system in accordance with embodiments of the invention

One non-limiting embodiment of a deposit management system for implementing the invention is shown in FIG. 3 and comprises one or more electronic databases 300 and one or more computers 310. In an embodiment, the one or more electronic databases 300, stored on one or more computer-readable media, comprises: aggregated account information for a plurality of government-backed insured and interest-bearing aggregated deposit accounts held in a plurality of recipient institutions in a deposit management system (DMS), wherein each of a plurality of the recipient institutions (but it need not be all of the recipient institutions) in the deposit management system holds at least one of the government-backed insured interest-bearing aggregated deposit accounts, wherein funds from a plurality of client accounts are aggregated with funds of other client accounts in the aggregated deposit accounts, wherein a client account represents funds of a client held in one or more of the interest-bearing aggregated deposit accounts held by the recipient institutions in the deposit management system and any other accounts managed by the DMS.

In embodiments, the one or more electronic databases further may comprise (ii) source institution deposit information including (1) time data on when a deposit was received into the system for deposit into interest-bearing aggregated deposit accounts held in one or more of the program institutions and/or how long the deposit has been held in the system, and (2) an amount of the deposit.

The one or more electronic databases may further comprise, in embodiments, client account information for each of a plurality of the respective client accounts comprising one or more or all of: (a) a respective balance in the respective client account, which comprises the funds of the client held in the one or more recipient institutions in aggregated deposit accounts held therein and/or managed in the program; (b) deposit/transfer and/or withdrawal/transfer data for the respective client account, which may include individual credit and debit data and/or nets of such credit and debit data for the client account, as previously described; and (c) a respective balance of funds from the respective client account held in each of one or more recipient institutions in the interest-bearing aggregated deposit accounts holding funds of the respective client account and in other accounts managed in the program.

The one or more computers 310 for the deposit management system, in embodiments, are operatively connected/accessible to computer-readable program code stored in memory, and are capable of executing program code therein to configure the one or more computers into one or more special-purpose machines. The code, in embodiments, may be comprised of programming modules that implement functional components in the one or more computers. These modules may be stored separately or in combination.

The one or more computers 310 are configured, in embodiments, with program code to form an obtaining component 320, for obtaining at least information on one or more respective deposit/transfer amounts and withdrawal/transfer amounts from source institutions. The fund withdrawal/transfer amounts or deposit/transfer amounts may be, for example, from one or more source institutions, or may be generated by the DMS 160 as part of a fund reallocation. In embodiments, the obtaining component comprises a communication component, configured on one or more computers, for receiving electronically at least information on a respective deposit/transfer amount and/or withdrawal/transfer amount to be transferred from or to a source institution to or from one or more other recipient institutions. In embodiments, this deposit/transfer data and/or withdrawal/transfer data may be keyed into the DMS 160 from information received by facsimile, or by telephone, or by email, or by other non-automated means. Note that a deposit/transfer amount and/or a withdrawal/transfer amount to be transferred may comprise funds of one or more client accounts held in the respective recipient institution(s) in one or more aggregated deposit accounts therein. In embodiments, such deposits/transfers and withdrawal/transfers may be the result of netting individual withdrawal/transfers and deposit/transfers from a plurality of individual client accounts over a period of time to comprise the deposit/transfer amount and/or withdrawal/transfer amount to be transferred to or from one or more of the recipient institutions.

The one or more computers 310 for the deposit management system may be further configured with program code to comprise an allocation engine 330 to obtain one or more recipient institutions each with at least one interest-bearing aggregated deposit account, to which to deposit/transfer funds, or from which to obtain withdrawals/transfers of all or respective portions of a withdrawal transfer amount. In embodiments, the allocation engine 330 may select recipient institutions with an interest-bearing aggregated deposit account based on one or more parameters, such as agreement to pay at or above a certain rate of interest, or a relative credit-worthiness level of the institutions, and/or based on source fund reciprocity, and/or based on an agreement to hold fund for some minimum period of time, to name a few. The allocation engine 330 allocates the deposit/transfer amount and/or the withdrawal/transfer amount to one of the recipient institutions, or allocates portions of the deposit/transfer amount or the withdrawal/transfer amount among a plurality of the recipient institutions, based on the one or more parameters, such as interest, etc.

By way of example, one parameter may comprise an amount of funds that the prospective recipient institution, when operating as a source institution, has provided to the deposit management system to be held in aggregated deposit accounts or other accounts of other recipient institutions in the deposit management system relative to other prospective recipient institutions in the system. This parameter determination comprises, in embodiments, comparing an updated amount of source funds of the prospective recipient institution (when operated as a source institution) to the updated source fund amounts of other prospective recipient institutions (when operating as source institutions). One or more other parameters may also be used in selecting the one or more recipient institutions, such as an amount of funds already held in the prospective recipient institution by one or more of the client accounts, based on such considerations as insurance limits and client designated amounts and percentages to be held in a given recipient institution.

The one or more computers 310 for the deposit management system may be further configured, in embodiments, with program code for a transfer data generator 340 for generating data for the respective recipient institution on deposits/transfers and withdrawals/transfers thereto. In embodiments, the transfer data generator 340 may comprise an instruction generator for generating instructions to be communicated to the respective recipient institution. In embodiments, instructions for deposits/transfers and/or withdrawals/transfer may be wired or emailed or otherwise communicated directly to the recipient institution. In embodiments, instructions for withdrawal transfers may be communicated in person by a messenger, or other method prescribed by Federal regulations to avoid withdrawal restriction limits imposed by regulation.

The one or more computers 310 for the deposit management system may be further configured, with program code to comprise an interest calculator component 350 for calculating or obtaining interest for deposits from a respective source institution based at least in part on an interest rate determined by one or more dimensions including a time dimension for the deposit.

A system bus 360 may further be provided in embodiments to facilitate electronic data communication among the components.

The present invention can be used in various kinds of deposit management programs and deposit sweep programs, as well as programs hereinafter developed. The present invention can also be used in the demand deposit marketplace, with insured deposit bank sweep products.

As noted, an exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Embodiments within the scope of the present invention include program products comprising machine-readable media with machine-executable instructions or data structures stored thereon. Such machine-readable media can be any available storage media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions. Note that the machine-executable instructions/programming code may comprise algorithms embedded in Excel or other spreadsheets.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced with one or multiple computers in a networked environment using logical connections to one or more remote computers (including mobile devices) having processors. Logical connections may include a local area network (LAN) and a wide area network (WAN) that are presented here by way of example and not limitation. Such networked environments are commonplace in office-wide or enterprise-wide computer networks, and include intranets and the Internet, and may use a wide variety of different communication protocols. Those skilled in the art will appreciate that such network computing environments will typically encompass many types of computer system configurations, including personal computers, hand-held devices such as mobile phones and other PDA appliances, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the."

All components, modes of communication, and/or processes described heretofore are interchangeable with similar components, modes of communication, and/or processes disclosed elsewhere in the specification, unless an express indication is made to the contrary.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

We claim:

1. A method comprising:

accessing, using one or more computer, one or more electronic databases, stored on one or more computer-readable media, comprising:

(i) aggregated account information for a plurality of Federal Deposit Insurance Corporation (FDIC)-insured and interest-bearing aggregated deposit accounts held in a plurality of banking institutions in a program, wherein funds from client accounts of a plurality of clients are held with funds of other client accounts in the plurality of aggregated deposit accounts held in the plurality of banking institutions in the program, the aggregated account information for a respective one of the aggregated deposit accounts comprising a balance of funds held in the respective aggregated deposit account, wherein there is no penalty for withdrawal of funds; and (ii) client account information for respective ones of the client accounts comprising:

(1) a respective client balance of funds held in the one or more interest-bearing aggregated deposit accounts held in the one or more banking institutions in the program;

(2) time data for the respective client account relating to a time parameter for a length of time funds are held in the aggregated deposit accounts in banking institutions participating in the program;

(3) a respective balance of funds from the respective client account held in each of the one or more aggregated deposit accounts holding Wilds of the respective client account; and (4) source institution information for a respective one of the banking institutions in the program designated as a source banking institution for the respective client account;

obtaining, using the one or more computers, client deposit data and/or client withdrawal data directly or indirectly from one of the clients or on its behalf describing a deposit to or a withdrawal from the respective client account associated with the one client;

allocating one or more respective amounts to one or more of the program banking institutions (not including the source banking institution) participating in the program to take into account at least in part the respective client deposit data and/or the respective client withdrawal data;

allocating, using the one or more computers, at least a matching amount of non-term funds to the source banking institution;

determining or obtaining at the end of a length of time, using the one or more computers, based at least in part on the time data in the database on the length of time the funds of the respective client account have been held within a balance range in the one or more aggregated deposit accounts in the banking institutions participating in the program, a respective time-varying interest rate that is greater than a first interest rate;

calculating or having calculated, using the one or more computers, based at least in part on the balance of deposit funds of the respective client account from the one or more databases being held in the one or more of the recipient banking institutions as non-term funds and the length of time held based on the time data in the one or more databases, a lump sum amount that when added to interest calculated at the first rate is an interest sum that results in an amount calculated at the time-varying interest rate, and allocating this interest sum to the respective client account;

calculating or having calculated, using the one or more computers, for the respective client account determined to have the first interest rate, a respective interest amount based at least in part on the respective first interest rate for the respective client account, the balance of funds and the length of time held, as determined from the one or more databases, and allocating this interest sum to the respective client account;

communicating or having communicated the data on calculated interest amounts for the respective client accounts with funds held in the one or more aggregated deposit accounts in the program; and updating, using the one or more computers, the one or more databases to reflect the added interest.

2. The method as defined in claim 1, wherein the first recited allocating step further comprises selecting one or more of the recipient institutions based at least in part a credit-worthiness of the respective recipient institution.

3. The method as defined in claim 1, wherein the funds of the client account to be deposited or to be withdrawn are time deposit funds.

4. The method as defined in claim 1, wherein the obtaining client deposit data and/or client withdrawal data comprises receiving one or more electronic networks sweep files containing the client deposit data and/or client withdrawal data.

5. The method as defined in claim 1, further comprising
transferring or having transferred, using the one or more computers and one or more electronic networks, funds based at least in part on one or more of the allocation steps.

6. The method as defined in claim 1, wherein the first recited allocating step further comprises selecting one or more of the recipient banking institutions for the first recited allocation based at least in part on an amount of funds the respective recipient banking institution has deposited for management under the program and is held in one or more other of the recipient banking institutions participating in the program.

7. The method as defined in claim 1, wherein the time-varying interest rate is determined using at least two-dimensional tiering, with the length of time the deposit funds are held as one dimension, and the balance in the respective client account as another dimension.

8. The method as defined in claim 1, wherein the time-varying interest rate is determined using a plurality of tiering tables based at least in part on the length of time the funds are held and the balance in the respective client account.

9. The method as defined in claim 1, further comprising
transferring or having transferred, using one or more computers and one or more electronic networks, funds based at least in part on the allocating step.

10. A method, comprising:
accessing, using one or more computers, one or more databases stored on one or more computer-readable media, comprising:
  (i) aggregated account information for a plurality of Federal Deposit insurance Corporation (FDIC)-insured and interest-bearing aggregated deposit accounts held in a plurality of recipient banking institutions participating in a program, wherein funds from client accounts of a plurality of clients are held with funds of other client accounts in the plurality of aggregated deposit accounts held in the plurality of banking institutions in the program, the aggregated account information for a respective one of the aggregated deposit accounts comprising a balance of funds held in the respective aggregated deposit account, wherein there is no penalty for withdrawal of funds,
  (ii) client account information for respective ones of the client accounts comprising:
    (1) time data on when a deposit was received for deposit into one or more of the interest-bearing aggregated deposit accounts held in one or more of the recipient banking institutions and/or how long the deposit has been held in the program,
    (2) a predetermined interest rate for the deposit that is higher than a market rate,
    (3) an amount of the deposit, and
    (4) a predetermined time period;
obtaining, using the one or more computers, an order into the system from a source institution that is one of the recipient banking institutions participating in the program, to distribute an amount of deposit funds associated with the respective predetermined interest rate and the respective predetermined time period to one or more other recipient banking institutions participating in the program, where that source institution has agreed to pay an amount equivalent to interest on a matching amount of funds of at least the predetermined interest rate;
allocating as non-term funds for deposit, using the one or more computers, the amount of the deposit funds as one or more tranches of the deposit funds from the source institution to one or more of the recipient banking institutions to one or more of the aggregated deposit accounts held therein, wherein the interest rate applied by one or more of the recipient banking institutions for funds allocated of the deposit is different from the predetermined interest rate;
allocating, using the one or more computers, at least the matching amount of non-term funds to the source institution that has agreed to pay the amount equivalent interest on the matching amount of non-term funds of at least the predetermined interest rate;
determining, using the one or more computers and the one or more databases, whether the deposit funds sourced as non-term funds to the one or more of the aggregated deposit accounts were maintained in the one or more of the recipient banking institutions for the predetermined time period;
calculating or having calculated, using the one or more computers, when the deposit funds of the respective client account allocated as non-term funds have been maintained in the one or more of the recipient banking institutions receiving the allocation for the predetermined time period, based at least in part on the balance of the deposit funds and the time data for the respective client account from the one or more databases, a lump sum amount that when added to interest calculated at the different interest rate is an interest sum that results in an amount calculated at the predetermined interest rate, and allocating this interest sum to the respective client account;
calculating or having calculated, using the one or more computers, when the deposit funds of the respective client account allocated as non-term funds have not been maintained in the one or more of the recipient banking institutions receiving the allocation for the predetermined time period, based at least in part on the balance of the deposit funds and the time data for the respective client account from the one or more databases, an amount calculated at the different interest rate, and allocating this interest sum to the respective client account; and updating, using the one or more computers, the one or more databases to reflect the added interest.

11. The method as defined in claim 10, further comprising transferring or having transferred, using the one or more computers and one or more electronic networks, funds based at least in part on one or more of the allocating steps.

12. The method as defined in claim 10, wherein the first recited allocating step further comprises selecting one or more of the recipient banking institutions for the first allocation based at least in part on an amount of funds the respective recipient banking institution has deposited for management under the program and is held in one or more other of the recipient banking institutions participating in the program.

13. The method as defined in claim 10, wherein the funds of the client account to be deposited or to be withdrawn are time deposit funds.

* * * * *

UNITED STATES PATENT AND TRADEMARK OFFICE
CERTIFICATE OF CORRECTION

| | | |
|---|---|---|
| PATENT NO. | : 8,583,545 B1 | Page 1 of 1 |
| APPLICATION NO. | : 13/237699 | |
| DATED | : November 12, 2013 | |
| INVENTOR(S) | : Bruce Bent, Bruce Bent, II and David Edgar Gareis | |

It is certified that error appears in the above-identified patent and that said Letters Patent is hereby corrected as shown below:

In the Claims:

Column 26, claim 1, line 32, reading "aggregated deposit accounts holding Wilds of the" should be changed to --aggregated deposit accounts holding funds of the--

Signed and Sealed this
Eleventh Day of February, 2014

Michelle K. Lee
*Deputy Director of the United States Patent and Trademark Office*